United States Patent
Ravishankar et al.

(10) Patent No.: US 12,341,598 B2
(45) Date of Patent: Jun. 24, 2025

(54) MAC LAYER ENHANCEMENT FOR AN AIR INTERFACE IN A SATELLITE COMMUNICATION SYSTEM

(71) Applicant: HUGHES NETWORK SYSTEMS LLC, Germantown, MD (US)

(72) Inventors: Channasandra Ravishankar, Clarksburg, MD (US); Gaguk Zakaria, College Park, MD (US); John E. Corrigan, III, Chevy Chase, MD (US)

(73) Assignee: HUGHES NETWORK SYSTEMS LLC, Germantown, MD (US)

( * ) Notice: Subject to any disclaimer, the term of this patent is extended or adjusted under 35 U.S.C. 154(b) by 348 days.

(21) Appl. No.: 17/886,558

(22) Filed: Aug. 12, 2022

(65) Prior Publication Data

US 2023/0275649 A1  Aug. 31, 2023

Related U.S. Application Data

(60) Provisional application No. 63/233,734, filed on Aug. 16, 2021.

(51) Int. Cl.
| | |
|---|---|
| *H04B 7/00* | (2006.01) |
| *H04B 7/185* | (2006.01) |
| *H04W 52/02* | (2009.01) |
| *H04W 72/044* | (2023.01) |
| *H04W 72/1263* | (2023.01) |
| *H04W 72/231* | (2023.01) |

(52) U.S. Cl.
CPC .... *H04B 7/18513* (2013.01); *H04W 52/0274* (2013.01); *H04W 72/046* (2013.01); *H04W 72/1263* (2013.01); *H04W 72/231* (2023.01)

(58) Field of Classification Search
CPC ............ H04B 7/18513; H04W 72/231; H04W 72/046; H04W 72/1263; H04W 52/0274
See application file for complete search history.

(56) References Cited

U.S. PATENT DOCUMENTS

| | | |
|---|---|---|
| 10,320,712 B2 | 6/2019 | Scott |
| 2015/0063203 A1 | 3/2015 | Kim et al. |
| 2015/0270890 A1 | 9/2015 | Vasavada et al. |
| 2016/0274240 A1 | 9/2016 | Wheatley |
| 2017/0195101 A1 | 7/2017 | Shahar |
| 2017/0366251 A1 | 12/2017 | Ravishankar et al. |

(Continued)

OTHER PUBLICATIONS

Non-Final Office Action mailed Sep. 16, 2024 in U.S. Appl. No. 17/863,467 (62 pages).

(Continued)

*Primary Examiner* — Erika A Washington
(74) *Attorney, Agent, or Firm* — NovoTechIP International PLLC

(57) ABSTRACT

MAC layer enhancements in protocol stacks of a user terminal of a satellite communication system such as a 5G based system. The MAC layer may include a scheduler that allows resource aggregation by allocating additional radio resources to users on one beam using carriers allocated to an adjacent beam. The MAC layer enhancements may also provide user terminals the ability to report their battery status to the scheduler which can then send signals to the user terminal that allow the terminal to shut down electronics to conserve power resources based on the battery status.

17 Claims, 23 Drawing Sheets

(56) References Cited

U.S. PATENT DOCUMENTS

| | | |
|---|---|---|
| 2018/0375707 A1 | 12/2018 | Bala et al. |
| 2020/0036435 A1 | 1/2020 | Ravishankar et al. |
| 2020/0099443 A1 | 3/2020 | Ravishankar et al. |
| 2021/0092640 A1 | 3/2021 | Ravishankar et al. |
| 2021/0144539 A1 | 5/2021 | Edge et al. |
| 2021/0184764 A1 | 6/2021 | Metzger et al. |
| 2021/0345273 A1 | 11/2021 | Xing et al. |
| 2021/0367663 A1* | 11/2021 | Ravishankar ........ H04B 7/2643 |
| 2022/0094428 A1* | 3/2022 | Rainish .............. H04B 7/18515 |
| 2023/0179294 A1 | 6/2023 | Kuang et al. |

OTHER PUBLICATIONS

Non-Final Office Action issued Oct. 17, 2024 in U.S. Appl. No. 17/879,399, filed Aug. 2, 2022.
International Search Report and Written Opinion issued Nov. 18, 2022 in corresponding PCT/US2022/040284.
International Search Report and Written Opinion issued Nov. 18, 2022 in related PCT/US2022/040154.
International Search Report and Written Opinion issued Nov. 18, 2022 in related PCT/US2022/040146.
Kibria, et al., "Carrier Aggregation in Satellite Communications: Impact and Performance Study", IEEE Open Journal of the Communications Society, IEEE, vol. 1, Sep. 9, 2020 (Sep. 9, 2020), pp. 1390-1402.
Lagunas, et al., "Dealing with Non-Uniform Demands in Flexible GEO Satellites: The Carrier Aggregation Perspective", 2020 10th Advanced Satellite Multimedia Systems Conference and the 16th Signal Processing for Space Communications Workshop (ASMS/SPSC), IEEE, Oct. 20, 2020 (Oct. 20, 2020), pp. 1-5.
Final office action issued Apr. 29, 2025 in U.S. Appl. No. 17/879,399.

\* cited by examiner

MAC LAYER ENHANCEMENT FOR AN AIR INTERFACE IN A SATELLITE COMMUNICATION SYSTEM

BACKGROUND

The need for high-speed broadband network systems has become increasingly important throughout the world. Satellite systems, including non-geostationary (NGSO) satellite systems, can provide global high-speed data connectivity. However, existing systems may not readily integrate with existing terrestrial communication systems, such as 5G networks. Thus, there are significant areas needing new and improved mechanisms for enhanced satellite-based coverage and interface with terrestrial communications systems.

SUMMARY

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

An example implementation provides a satellite gateway configured to communicate with a plurality of satellites over an air-interface; and a medium access control (MAC) layer in a protocol stack of the satellite gateway that supports the air-interface, wherein the MAC layer comprises a resource aggregation block to aggregate radio resources when allocating radio resources to a user terminal on a beam.

Another example implementation provides method for satellite communication provides communicating by satellite gateway with a plurality of satellites over an air-interface; supporting the air-interface with a medium access control (MAC) layer in a protocol stack of the satellite gateway that supports the air-interface; and allocating additional radio resources to a user terminal on a first beam by the MAC layer to provide resource aggregation that increases throughput for the user terminal.

Another example implementation provides satellite communication system provides a satellite gateway communicating with a plurality of satellites over an air-interface; and a medium access control (MAC) layer in a protocol stack of the satellite gateway that supports the air-interface comprises a resource aggregation block to aggregate radio resources when allocating radio resources to a user terminal, wherein: resource aggregation block provides beam aggregation that allocates resources of an adjacent beam to a user terminal on a beam by first scheduling the user terminal on a first carrier, and after determining the user terminal is close to the adjacent beam, the MAC layer schedules the user terminal on a second carrier associated with the adjacent beam.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The instant disclosure provides systems and methods for an improved air interface for satellite systems such as a 5G-based non-geostationary (NGSO) satellite system. The air interface is based on terrestrial 5G protocols/waveforms. The systems and methods provided herein define an air interface and protocols at access stratum for efficient operation over NGSO systems. The air interface may maintain connectivity to standard terrestrial 5G Core Network and may also be used to support 4G-based systems. The air interface includes an improved forward link for communicating from the satellite gateway to the user terminal and a return link for communicating from the user terminal to the satellite gateway.

The instant disclosure further provides enhancements in a MAC layer of the user terminal protocol stacks for the air interface of a satellite system such as a 5G based system. The MAC layer may include a scheduler that allows resource aggregation by allocating additional radio resources to users on one beam using carriers allocated to an adjacent beam. The MAC layer enhancements may also provide user terminals the ability to report their battery status to the scheduler which can then send signals to the user terminal that allow the terminal to shut down electronics to conserve power resources based on the battery status.

Figure 1:
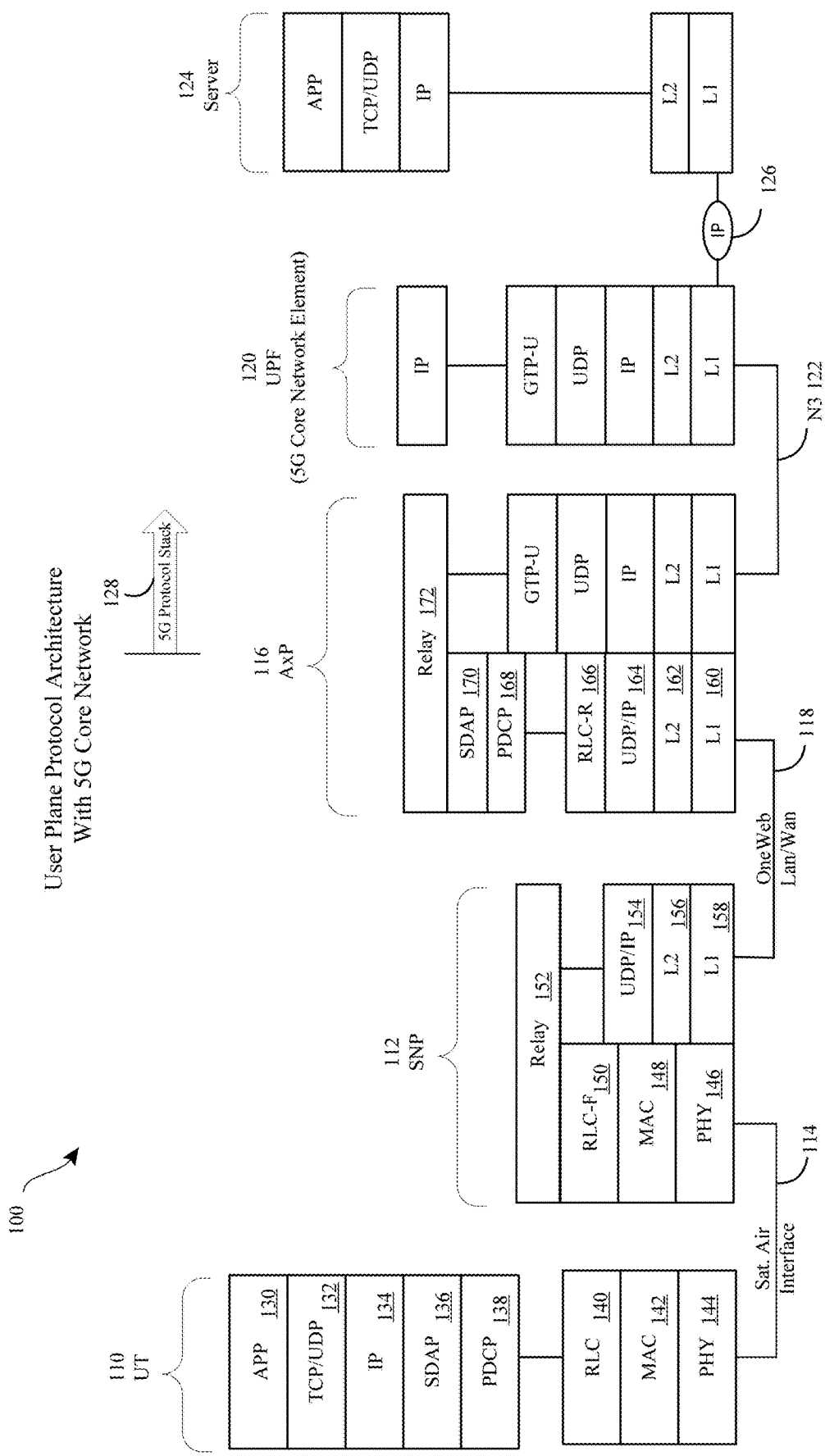
FIG. 1 illustrates a user plane protocol architecture for a 5G core network according to an embodiment of the disclosure.

FIG. 1 illustrates an example user plane protocol architecture 100 for a 5G core network. In this example, the user plane protocol architecture 100 supports communication from a user terminal (UT) to a server. The UT (not shown) communicates with a UT terminal protocol stack 110 to a satellite network portal (SNP) protocol stack 112 over a satellite air interface 114. The SNP communicates using the SNP protocol stack 112 to an anchor processor with an anchor processor (AxP) stack 116 over a LAN/WAN 118. The SNP and the anchor processor with their associated protocol stacks are typically part of a satellite gateway. The SNP may be located at the same location or separate locations connected by the LAN/WAN 118. The anchor processor with the anchor processor stack 116 is connected to a user plane function (UPF) with a UPF protocol stack 120 over an N3 network connection 122 in a manner that is typical for a 5G network. The N3 interface is a standard interface in 5G networks that performs the role of conveying user data from a 5G radio access network (RAN) to the UPF. The UPF with a UPF protocol stack 120 communicates with the server and the server protocol stack 124 over the internet protocol (IP) network 126. From the downlink portion of the AxP stack 116 to the server protocol stack 124, indicated by arrow 128, the user plane protocols may utilize standard terrestrial 5G protocol stacks as known in the art.

The UT protocol stack 110 includes, from top to bottom, an application block 130, a transmission control protocol/user datagram protocol (TCP/UDP) block 132, an internet protocol (IP) block 134, a service data adaption protocol (SDAP) block 136, a packet data convergence protocol (PDCP) block 138, a radio link control (RLC) block 140, a medium access control (MAC) block 142 and a physical layer (PHY) block 144. The user plane protocol stack in the SNP includes a physical layer (PHY) block 146, a MAC layer block 148, an RLC-F block 150, a relay block 152, a UDP/IP block 154, an L2 block 156 and an L1 block 158. The AxP protocol stack 116 includes an L1 block 160, an L2 block 162, UDP/IP block 164, an RLC-R block 166, a PDCP block 168, a SDAP block 170 and a relay block 172. The remaining protocol blocks in the AxP 116, the UPF 120, and the server 124 may utilize standard protocol blocks.

Figure 2:
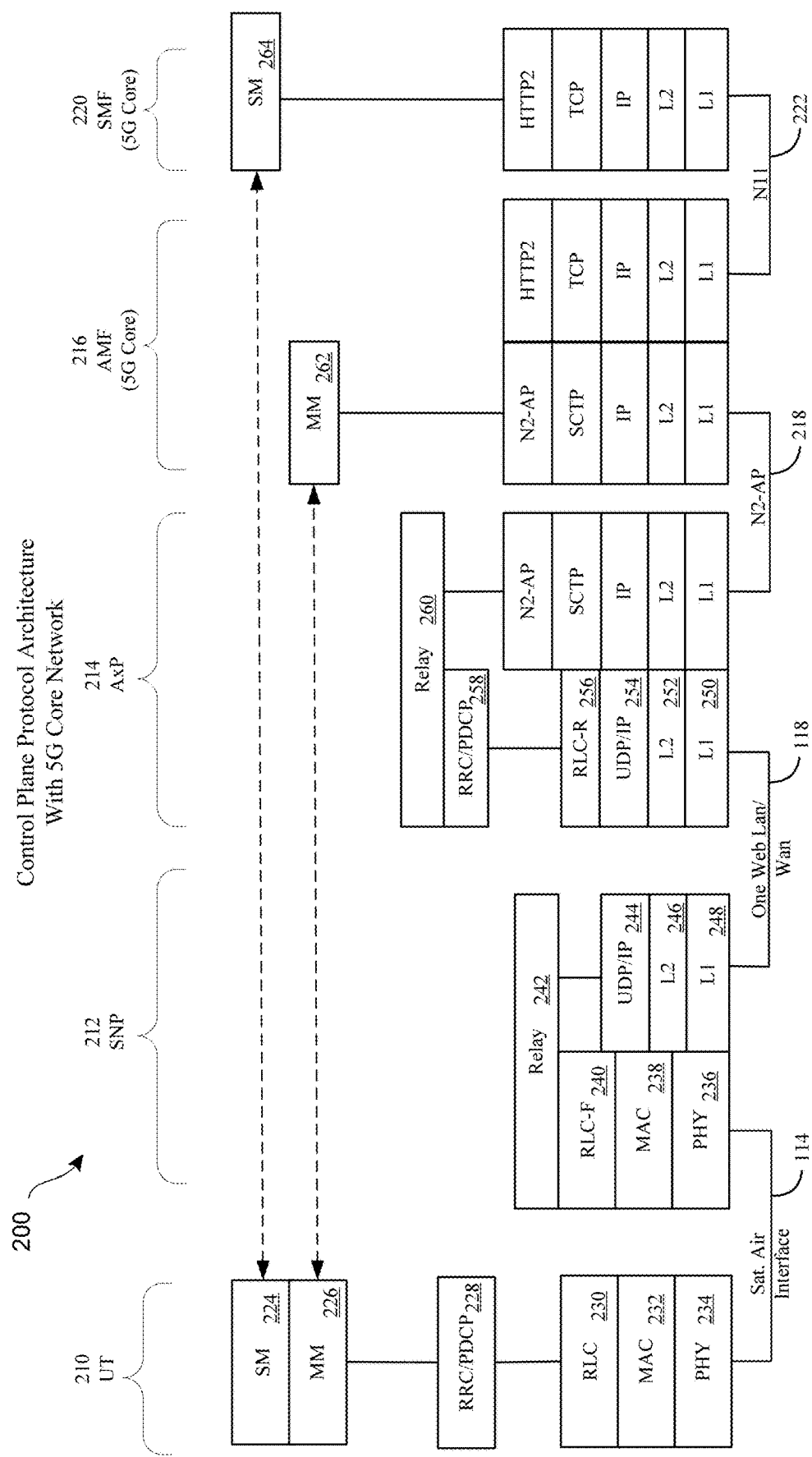
FIG. 2 illustrates a control plane protocol architecture for a 5G core network according to an embodiment of the disclosure.

FIG. 2 illustrates a control plane protocol architecture 200 for a 5G core network according to an embodiment of the disclosure. Similar as above, the control plane protocol architecture 200 supports communication from a UT to a server. The UT (not shown) communicates with a UT protocol stack 210 to a SNP protocol stack 212 over the satellite air interface 114. The SNP communicates using the SNP protocol stack 212 to an anchor processor with an anchor processor (AxP) stack 214 over a LAN/WAN 118 such as OneWeb. The anchor processor with the anchor processor stack 214 is connected to an access mobility management function (AMF) with an AMF protocol stack 216 over an N2-AP network connection 218 in a manner that is typical for a 5G network. The N2-AP interface 218 is a standard interface in 5G networks. The AMF with the AMF protocol stack 216 communicates with a session management function 220 over the N11 network 222. From the downlink portion of the AxP stack 214 to the SMF protocol stack 220, the user plane protocols may utilize standard terrestrial 5G protocol stacks as known in the art.

The UT control plane protocol stack 210 includes, from top to bottom, an SM block 224, a MM block 226, a radio resource control (RRC)/PDCP block 228, a radio link control (RLC) block 230, a medium access control (MAC) block 232 and a physical layer (PHY) block 234. The control plane protocol stack in the SNP includes a PHY block 236, a MAC layer block 238, an RLC-F block 240, a relay block 242, a UDP/IP block 244, an L2 block 246 and an L1 block 248. The AxP protocol stack 214 includes an L1 block 250, an L2 block 252, UDP/IP block 254, an RRC/PDCP block 258, and a relay block 260. The SM block 224 of the UT protocol stack 210 communicates with an associated SM block 264 of the SMF protocol stack 220, and the MM block 226 of the UT protocol stack 210 communicates with an associated MM block of the AMF protocol stack 216. The remaining protocol blocks in the AxP 116, the AMF 216, and the SMF 20 may utilize standard protocol blocks. The SM blocks 224, 264 and the MM blocks 226, 262 are part of a non-access stratum in 4G and 5G networks. In the examples herein, the SM blocks and MM blocks may operate as known in the prior art.

Figure 3A:
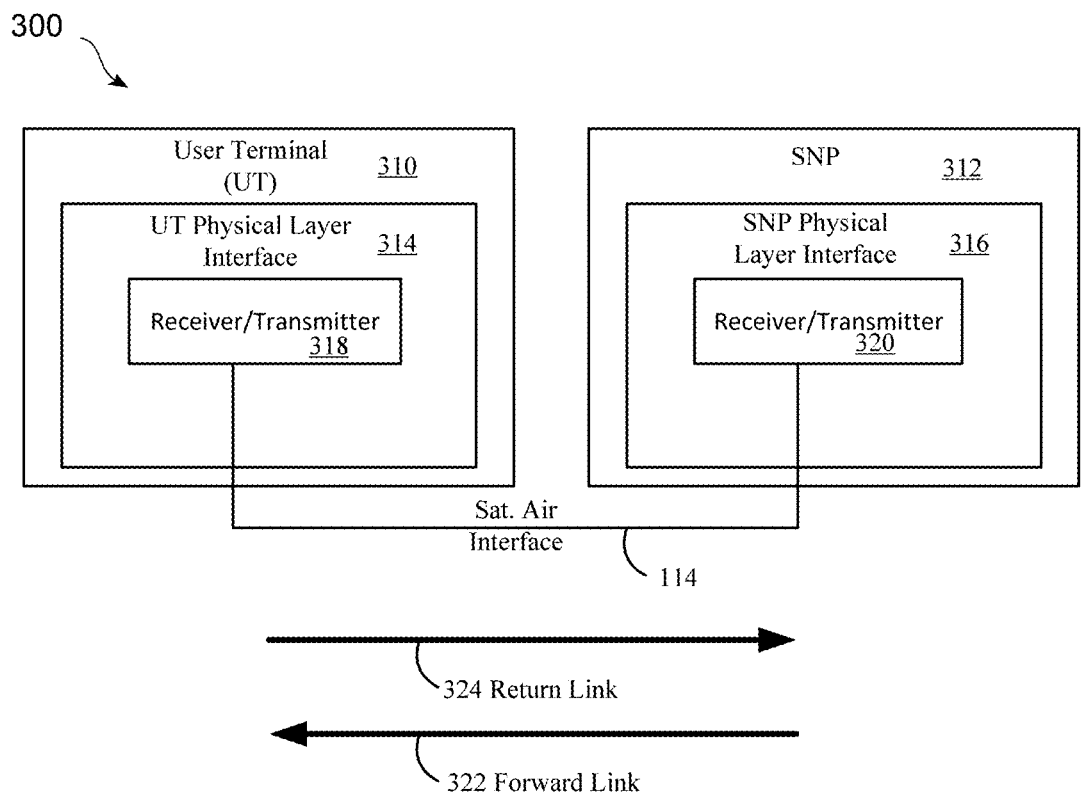
FIG. 3A is a block diagram of an example physical layer connection between a UT and the satellite network portal (SNP).

FIG. 3A is a block diagram of an example physical layer connection 300 for a satellite communication system between a ground-based UT 310 and the SNP 312 on a satellite gateway (not shown). The physical layer connection 300 includes a UT physical layer interface 314 on the UT 310 connected to an SNP physical layer interface 316 on the SNP 312 over the satellite air interface 114. The UT physical layer interface 314 is part of a UT 310 of the satellite communication system. The SNP physical layer interface 316 is part of the SNP 312 on the gateway of the satellite communication system. The UT physical layer interface 314 and the SNP physical layer interface 316 each include a receiver/transmitter 318, 320. The UT physical layer interface 314 and the SNP physical layer interface 316 provide hardware support of the PHY protocol stacks 144, 146, 234, 236 described above with reference to FIG. 1 and FIG. 2. The satellite air interface 114 includes forward link communication 322 and return link communication 324. The forward link 322 includes communication over the air interface 114 from the SNP to the UT. The return link 324 includes communication over the air interface 114 from the UT to the SNP. The forward link communication 322 and the return link communication is described further below.

Figure 3B:
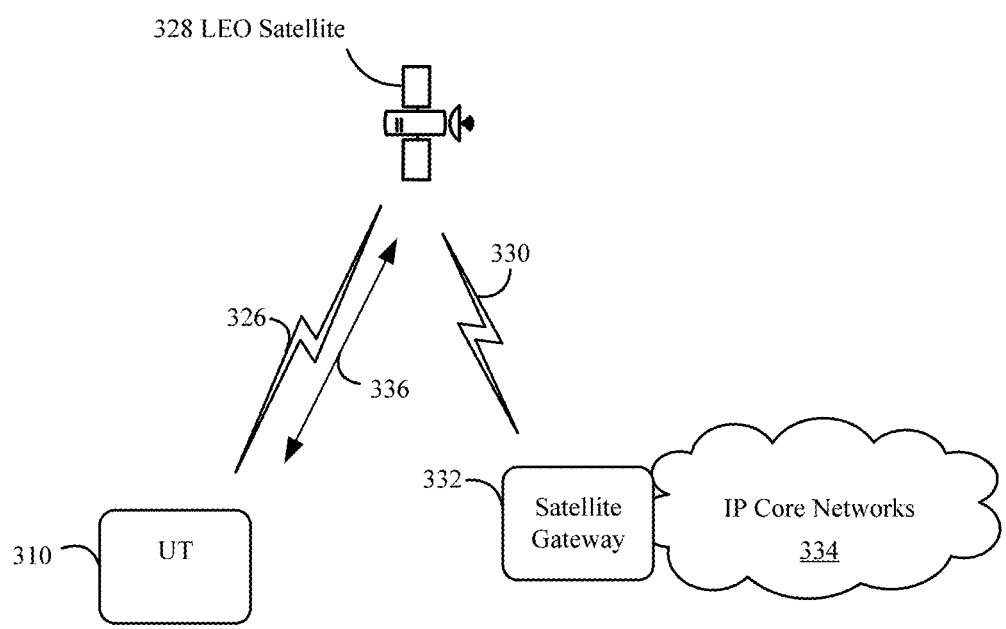
FIG. 3B is a block diagram of a satellite view of the physical layer connection.

FIG. 3B is a block diagram of a satellite view of the physical layer connection 300. The physical layer connection 300 is part of and provides the connection for the air interface 114 described above. The physical layer connection 300 includes communication 326 to and from a UT 310 to a satellite such as LEO satellite 328. The physical layer connection 300 further includes communication 330 between the satellite 328 and a satellite gateway 332. The satellite gateway 332 includes the SNP 312 shown in FIG. 3A. The satellite gateway 332 is connected to the various parts of an IP core network 334 as shown in FIGS. 1 and 2. The communication 326 between the UT 310 and the satellite 328 typically includes a pulse signal 336 to communicate global positioning system (GPS) information. The pulse signal 336 is typically one pulse per second. This GPS pulsed signal 336 is used herein to create and align the forward link frame structure as described below with reference to FIG. 6.

Figure 4:
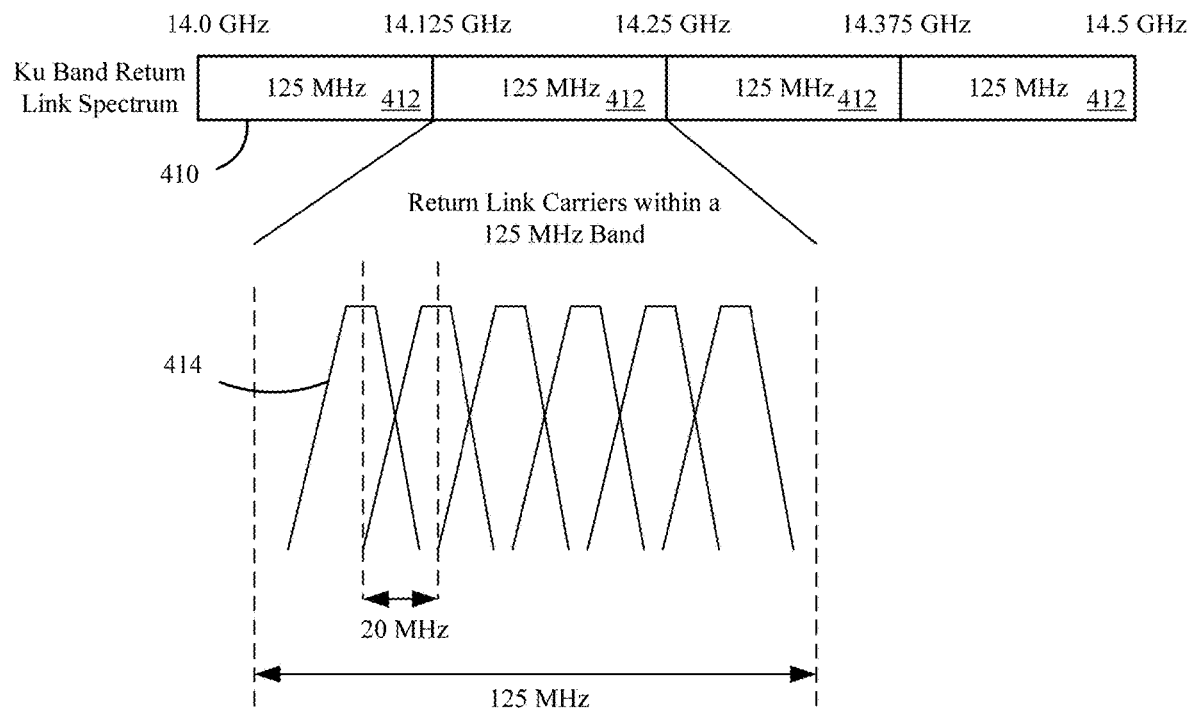
FIG. 4 is a diagram representing a return link spectrum according to the prior art.

FIG. 4 is a diagram representing a return link spectrum according to the prior art. In this example, the return link spectrum is a KU carrier band that carries data between a satellite and the UT. The KU band return link spectrum 410 in the illustrated example spans from 14.0 GHz to 14.5 GHZ. The return link spectrum 410 is divided into four 125 MHz carrier bands 412. Each 125 MHz carrier band 412 is divided into six 20 MHz return link carriers 414. Each of the 20 MHz return link carriers 414 is used to transmit data on a satellite link as known in the prior art.

Figure 5A:
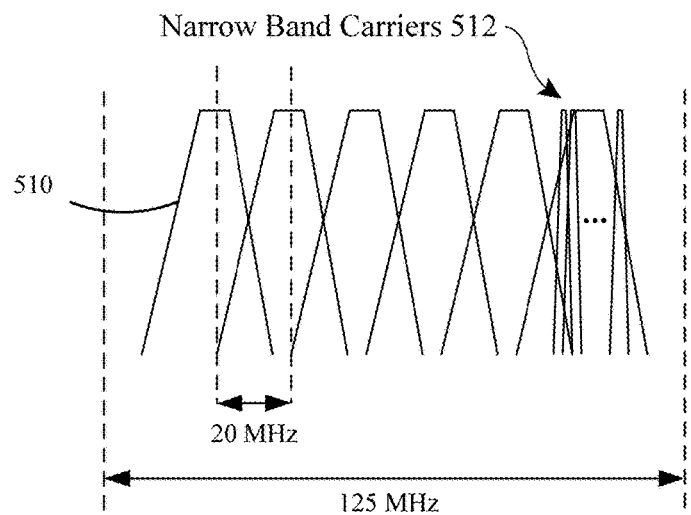
FIG. 5A illustrates narrow band carriers added into the return link spectrum according to disclosed embodiments.

FIG. 5A illustrates narrow band carriers added into the return link spectrum according to disclosed embodiments. Like the prior art example in FIG. 4, the KU band return link spectrum is divided into 125 MHz carrier bands. Each 125 MHz carrier band may be further divided into return link carriers 510. The return link carriers may be used to transmit data on a satellite return link. In this example, the 125 MHz carrier band is divided into six 20 MHz return link carriers 510. To improve efficiency and effective use of the return link carriers, the return link carriers may be further divided. In the illustrate example in FIG. 5A, the sixth 20 MHz return link carrier is further divided into multiple narrow band carriers 512. In an embodiment, the sixth 20 MHz return link carrier is divided into 10 narrow band carriers 512. The narrow band carriers can be allocated to more efficiently use the bandwidth of the 20 MHz return link carrier.

Figure 5B:
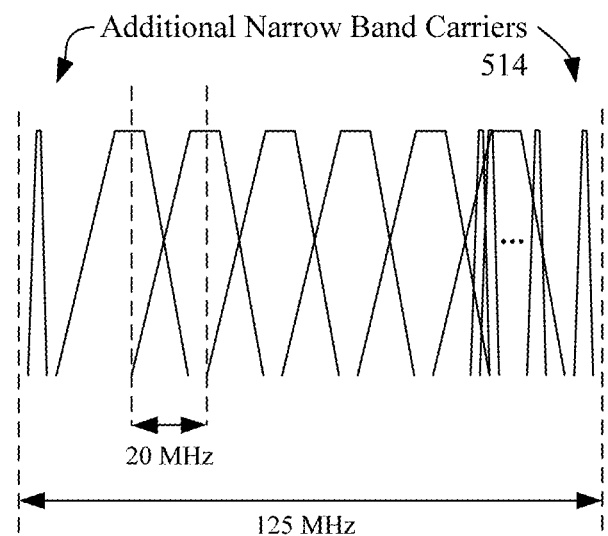
FIG. 5B illustrates additional band carriers added to the return link spectrum according to disclosed embodiments.

FIG. 5B illustrates additional band carriers added to the return link spectrum according to disclosed embodiments. As in the previous example, the KU band return link spectrum is divided into 125 MHz carrier bands. Each 125 MHz carrier band may be further divided into return link carriers 510 to transmit data on a satellite return link. Like the above, the 125 MHz carrier band may be divided into six 20 MHz return link carriers 510. In addition to the six 20 MHz return link carriers, additional narrow band carriers 514 may be added at either end of the 20 MHZ return link carrier. In this example, one additional narrow band carrier 514 is added at each end of the return link carrier. The additional narrow band carrier may be about 5 MHz. The additional narrow band carriers can be allocated to more efficiently use the bandwidth of the 125 MHz carrier band. The additional narrow band carriers 514 may be used in conjunction with one or more of the 20 MHz return link carrier divided into narrow band carriers as described above.

Figure 6A:
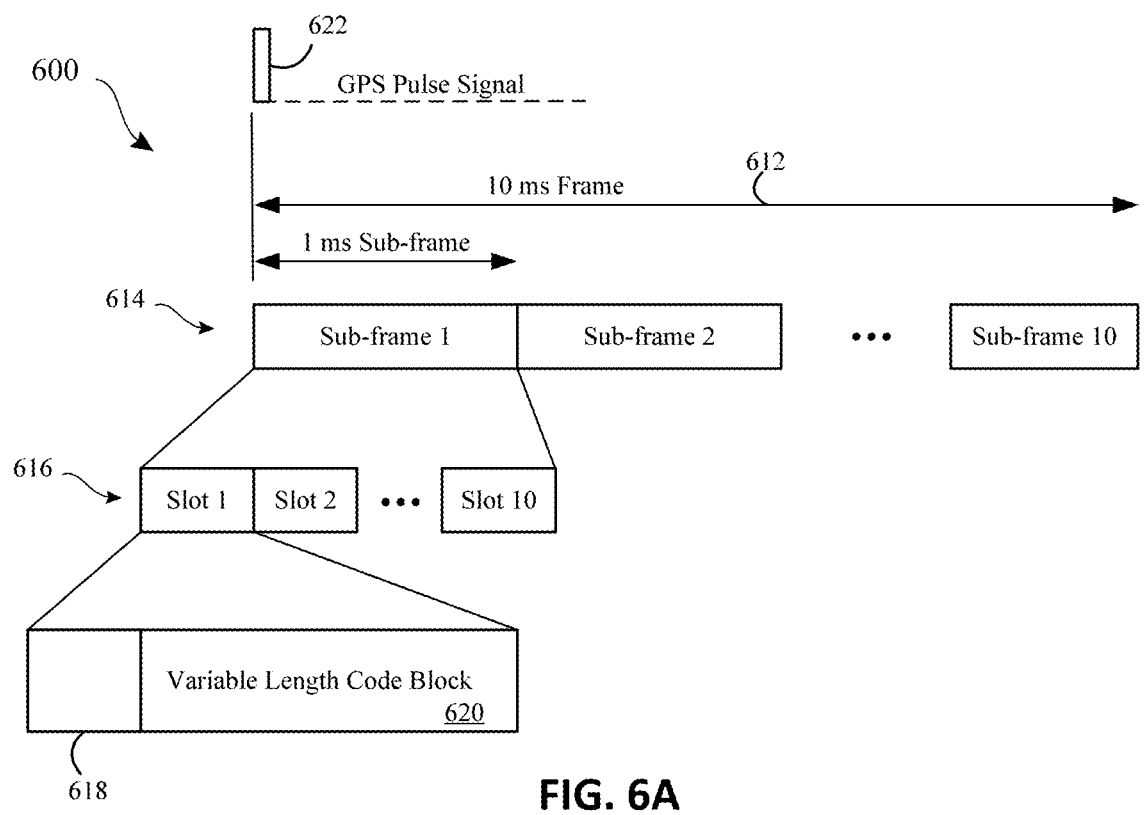
FIG. 6A is a diagram of an example forward link frame structure.

FIG. 6A is a diagram of an example forward link frame structure 600 according to embodiments herein. The forward link frame structure 600 illustrates the organization of data encoded on a carrier. The frame structure 600 in an embodiment includes a 10 ms frame 612 divided into 1 ms sub-frames 614. Each 1 ms sub-frame may be further divided into slots 616 as shown. In this example, each 1 ms sub-frame 614 is divided into 10 slots 616. Each of the slots 616 may contain header information 618 and variable length code blocks 620. The 1 ms sub-frames 614 may be advantageously aligned to GPS by aligning the sub-frames 614 to time markers of the GPS pulse signal 622 to preserve satellite duty cycling. The GPS pulse signal 622 may be a one pulse per second (PPS) GPS signal. Timing may be synchronized with a local clock (not shown). Using GPS based markers allows the satellite, Gateway and UT to be synchronized as GPS satellites are visible to all three entities. The GPS time markers are derived from signals received from navigation satellites such as GPS or Global Navigational Satellite System (GLONASS) satellites as shown and described above with reference to FIG. 3B. The forward link frame structure 600 is able to achieve a wide band carrier such as 238 Msps symbol rate with about 5% roll-off on a 250 MHz sub-carrier spacing.

Figure 6B:
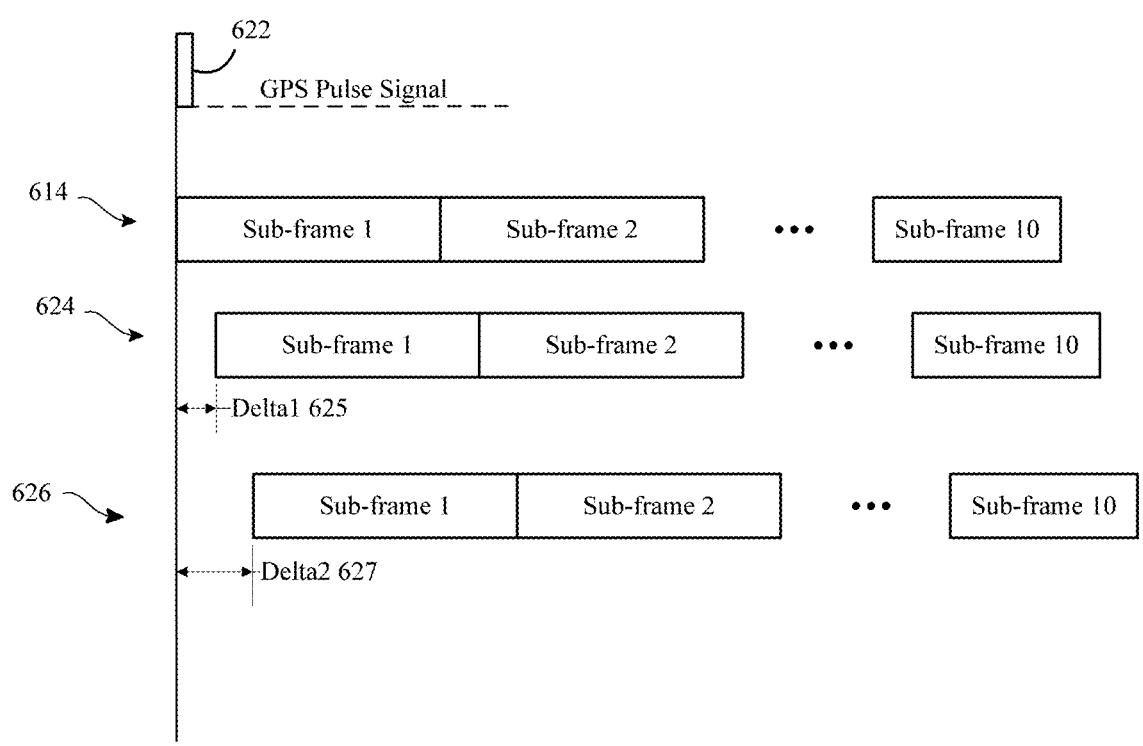
FIG. 6B is a diagram of an example forward link sub-frame structure where sub-frames are offset in time relative to the GPS pulse signal.

FIG. 6B is a diagram of an example forward link sub-frame structure where sub-frames are offset in time relative to the GPS pulse signal. In FIG. 6A, sub-frames were shown aligned to time markers of a GPS pulse signal. In the example of FIG. 6B, other sub-frames can be started at different offsets from the GPS pulse signal 622. In this example, a first set of sub-frames 614 is aligned to the GPS pulse signal 622 as shown above. A second set of sub-frames 624 is offset from the GPS pulse signal 622 by a time of delta1 625. Similarly, a third set of sub-frames 626 is offset from the GPS pulse signal 622 by a time of delta2 627. Delta1 625 and delta2 627 may be an appropriate time offset such as 0.1 ms.

Figure 6C:
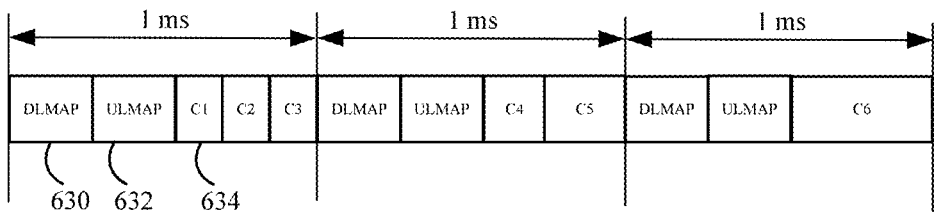
FIG. 6C is a diagram of an example forward link sub-frame structure according to the prior art.

FIG. 6C illustrates an example forward link sub-frame structure according to the prior art. The frame structure contains a downlink map (DLMAP) 630, an uplink map (ULMAP) 632 and a number of code blocks 632. In this example, the first subframe has code blocks 634 identified as C1, C2 and C3. The DLMAP 630 carries information about what user's data is present in the frame and how the data is coded. The ULMAP 632 carries information about—which user is allocated uplink resources to transmit. The code blocks 632 are blocks of information in the forward link. Each 1 ms sub-frame can carry a different number of code blocks 632 depending on the size of the code blocks as shown in FIG. 6B.

In FIG. 6B, the coding scheme used depends on the estimated signal quality for the users and the amount of data transmitted to the users. The DLMAP carries the ID of the users for which data is carried in the downlink (or forward link), the size of the code block and the coding scheme used. The DLMAP itself is coded in a robust manner since it has to be decodable by all users. The size of the DLAMP is fixed. The ULMAP is also strongly coded and includes the ID of the users to which an uplink allocation is made. It also contains the number of resources allocated to the users. In addition, the traditional code blocks 632 are sized such that an integer number of code blocks 632 can fit in a 1 ms sub-frame. This means that if one user's data is to be transmitted, the data is such that the code block completes in one 1 ms sub-frame. If this user has more downlink data, it must be transmitted in a subsequent code block.

Figure 6D:
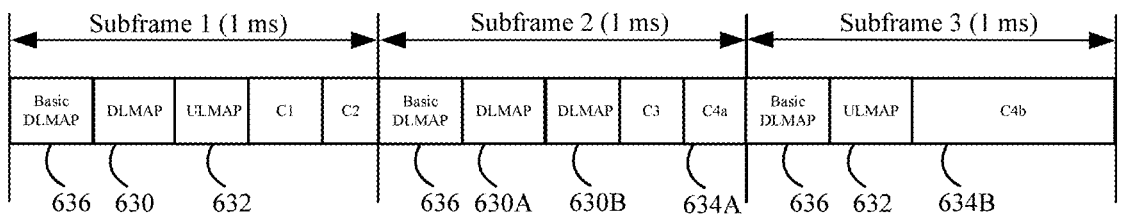
FIG. 6D is a diagram of an example forward link sub-frame structure.

FIG. 6D illustrates an example forward link sub-frame structure according to the claimed invention. The frame structure contains a Basic DLMAP 636 as further described herein. Each sub-frame in the frame structure also may include none or multiple DLMAPs 630 and may include a ULMAP 632 along with a number of code blocks 632 similar to those described above. In this example, the sub-frames include code blocks 634 C1, C2, C3, C4*a* and C4*b* as shown. The Basic DLMAP 636 introduced here is a very short DLMAP included in each 1 ms sub-frame. The Basic DLMAP 636 contains information on whether additional DLMAPs and a ULMAP are present in the sub-frame. The Basic DLMAP 636 may indicate there are no DLMAPs or several DLMAPs in the sub-frame. Further, the Basic DLMAP 636 may indicate the presence or absence of a ULMAP 632. In the illustrated example shown in FIG. 6C, sub-frame 1 has one DLMAP 630 and one ULMAP 632. The subframe 2 has two DLMAPs 630A, 630B and no ULMAP. And sub-frame 3 has zero DLMAPs.

The Basic DLMAP 636 is smaller in size and allows allocating DLMAPs and a ULMAP only when needed. If no DLMAP or ULMAP is needed, the space in the sub-frame normally used for the DLMAP and ULMAP can be allocated to code blocks to carry user information. No DLMAP may be needed, for example, when a user's data does not fit in the current sub-frame. In this example, user data C4*a* 634A and C4*b* 634B belong to user 3 and to the same code block as shown. The combined data of C4*a* 634A and C4*b* 634B does not fit in a single frame but can be accommodated in multiple frames. The absence of a DLMAP in sub-frame 3 allows additional user code data to fit in the subframe. The larger code block of C4A and C4B that spans across multiple sub-frames provides better error rate performance.

Figure 6E:
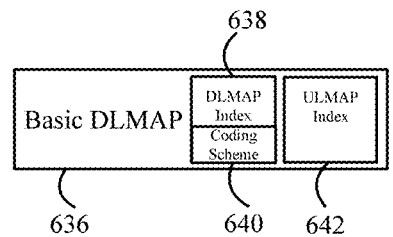
FIG. 6E is a diagram of an example Basic DLMAP structure.

FIG. 6E illustrates an example of the Basic DLMAP 636 described above that contains information on DLMAPs and a ULMAP present in the sub-frame. In this example, the Basic DLMAP 636 incudes a DLMAP index 638 and coding scheme 640 for the DLMAPs in the DLMAP index 638, and a ULMAP index 642. The DLMAP index 638 includes a bit or other data to indicate the number of DLMAPs included in the subframe. Similarly, the coding scheme may include a single bit or other data to indicate the coding scheme used for one or more DLMAPs in the sub-frame. The DLMAP index 638 may also include a bit or other data that indicate the size of the DLMAPs in the sub-frame. The Basic DLMAP 636 may further include a ULMAP index 642 that includes a bit or other data to indicate whether a ULMAP is included in the sub-frame. The size, order and coding type may be arranged in any suitable manner in the Basic DLMAP. The coding scheme for the DLMAPs in the sub-frame can be optimized for the user's link condition. There is no need for robust coding of the Basic DLMAP resulting in increased efficiency.

FIGS. 7-14 introduce transition satellite systems and methods for transition from legacy satellite systems to new satellite systems. In the described examples, reference to legacy systems and gateways refers to systems and gateways that support 4G air interfaces. As used herein, new systems will refer to systems such as 5G systems that use an advanced air interface as described herein. However, the inventive concepts described herein are applicable to transitions from any generation satellite system to the next generation. As described herein, new systems with user terminals, satellites and gateways can coexist with existing legacy systems allowing a gradual phase-out of legacy user terminals and systems. Transition from legacy satellite systems to new satellite systems may include gateway level transition, satellite level transition and carrier level transition.

Gateway level transition may be accomplished with an entire gateway that implements 5G air interface protocol as described herein to provide 5G services in a geographical area where legacy services are not provided. Satellite level transition may be accomplished with specific satellites in legacy coverage area dedicated for 5G services without impacting availability of legacy services. Carrier level transition may be accomplished with gateways that incorporate 4G and 5G air interfaces that coexist at beam and carrier level.

Gateway level transition may be accomplished by introducing a 5G air interface in select regions where legacy services are not active, for example where there is no gateway that provides legacy service in a given region. This method would be the least disruptive in terms of introduction of new services. In one example, a new gateway may be deployed that can communicate with the existing NGSO satellite constellation with a new air interface that is not compatible with the old legacy air interface. In this system, even if there is a legacy terminal that can have visibility to a satellite in that region, it will not be able to select that satellite for communication since the downlink broadcast channel is unreadable when the satellite is communicating with new gateway.

Figure 7:
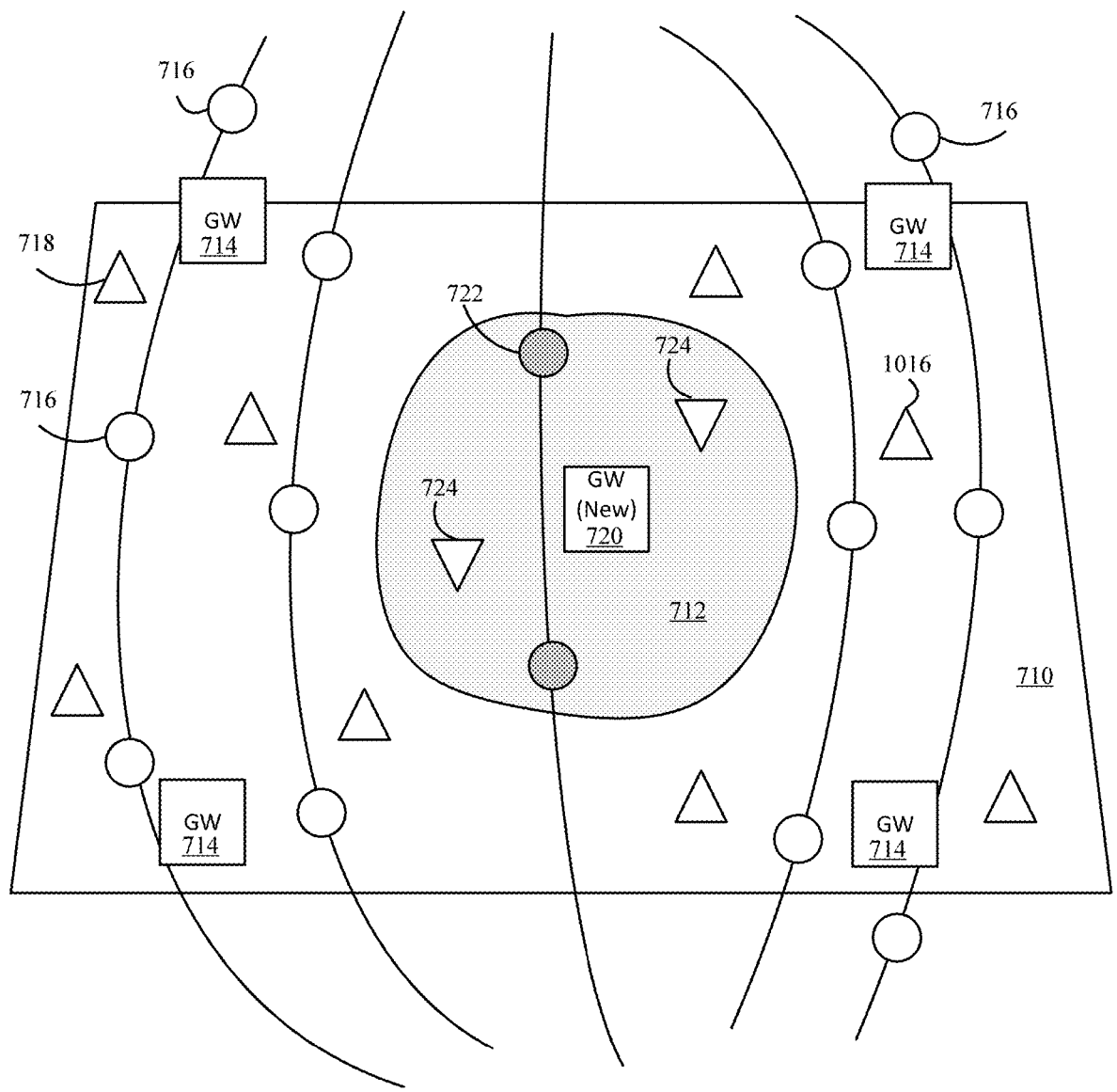
FIG. 7 represents a perspective view of satellites over a region of the earth's surface with both legacy and new satellite systems to illustrate gateway level transitioning.

FIG. 7 represents a perspective view of satellites over a region 710 of the earth's surface with both legacy and new satellite systems to illustrate gateway level transitioning. In this example, a legacy service is available throughout the region 710 except in a second region 712. The legacy system in this example is an existing LEO/MEO satellite system with a 4G air interface and the new system is a 5G air interfaced as described herein. The legacy system in region 710 includes gateways 714 that communicate with satellites 716. The satellites further communicate with UTs 718. In this example, the legacy service is unavailable in the second region 712. A new gateway 720 may be added in the transition to building a new system by adding gateway 720 which communicates with satellites 716 and UTs 724. The new gateway may communicate with the satellites 722 and the UTs 724 with the 5G air interface as described herein.

Figure 8:
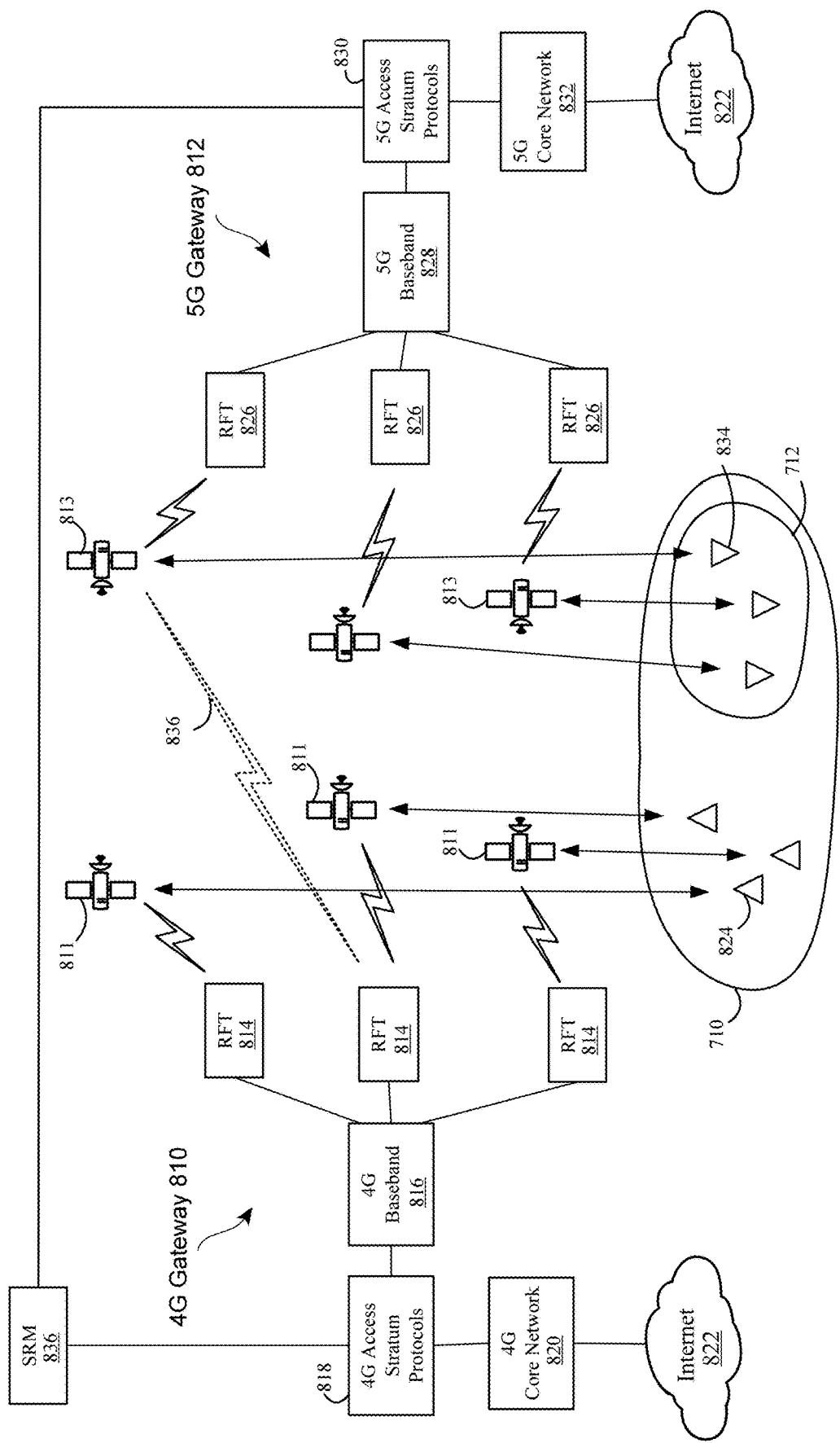
FIG. 8 illustrates a view of a legacy satellite system and a new satellite system over a region of the earth's surface to illustrate another example of gateway level transitioning.

FIG. 8 illustrates a view of a legacy satellite system and a new satellite system over a region of the earth's surface to illustrate another example of gateway level transitioning. In the illustrated example, the legacy satellite system includes a 4G gateway 810 that communicates with satellites 811. The new satellite system includes a 5G gateway 812 that communicates with satellites 813. The 4G gateway 810 includes a number of radio frequency transmitters (RFTs) 814 that communicate with the satellites 811. The RFTs 814 communicate with a 4G baseband module 816 that communicate with 4G access stratum protocols 818 to a 4G core network 820. The 4G core network 820 is also connected to the internet 822 to provide internet access to UTs 824 in the region 710 communicating with the satellites 811. The new satellite system includes a 5G gateway 812 that communicates with satellites 813. The 5G gateway 812 includes a number of radio frequency transmitters (RFTs) 826 that communicate with the satellites 813. The RFTs 826 communicate with a 5G baseband module 828 that communicates with 5G access stratum protocols 830 to a 5G core network 832. The 5G core network 832 is also connected to the internet 822 to provide internet access to UTs 834 in the region 712 communicating with the satellites 813.

As illustrated in FIG. 8, a new 5G gateway 812 may be completely dis-joint from the legacy 4G gateway 810. The satellite system may include a satellite resource manager (SRM). The SRM is usually part of a Network Operations Center (NOC). The NOC is a central server that is able to communicate with all the gateways. The NOC and the SRM may include geographical redundancy so that if the servers go down, another server with these systems can continue to operate. For example, a primary SRM could be in the US and a back-up SRM could be in the UK. The SRM 836 assigns satellites to gateways depending on the area that satellites cover on the earth. At any instant of time, a satellite is assigned to either a 4G gateway or a 5G gateway. For example, at a later point in time, satellite 722 may move over region 710 and out of region 712, satellite 722 may then communicate with the 4G gateway 810 through the 4G RFT 814 as shown at 838.

Transition from legacy satellite systems to new satellite systems may further be facilitated with satellite level transition. In regions where a legacy gateway is already serving customers, the SRM 836 is employed to associate certain RFTs of existing gateways to new user terminals, where the existing gateways have specific satellites that only talk to legacy user terminals and other RFTs. This is particularly applicable in northern and southern latitudes away from the equator. The SRM 836 would declare a satellite in a given orbital plane to be unavailable for legacy service. For example, to enable service with new air interface in Maryland (~40N,~77W), one satellite in an orbit would be turned OFF legacy service when the satellite is between 36.5N and 43.5N latitudes and between 69.5W and 84.5W. These satellites would be made available for the new air interface.

Figure 9B:
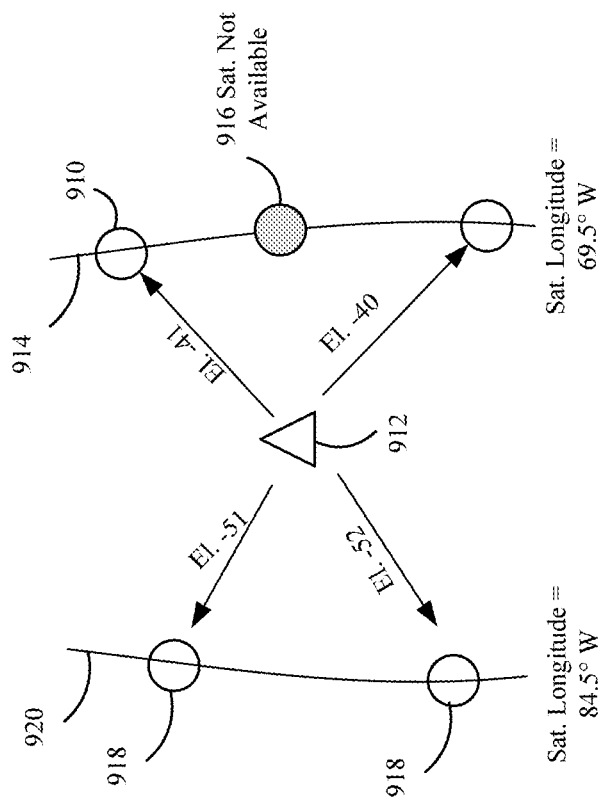
FIGS. 9A and 9B illustrate the impact of satellite sharing for satellite level transitioning.
Figure 9A:
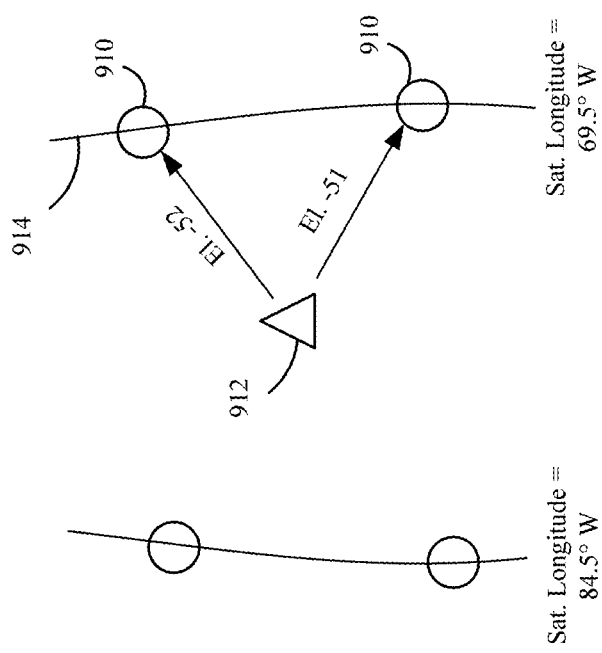

FIGS. 9A and 9B illustrate the impact of satellite sharing for satellite level transitioning. FIG. 9A shows an example of normal operation at a northern latitude. A number of satellites 910 communicate with a UT 912 while on a path 914 at a longitude of 69.5° W. The satellites 910 in this example have a 7.5° spacing (360/49). The UT 912 communicates with the satellites at elevation angles of 520 and 51°. FIG. 9B illustrates a scenario where one satellite becomes unavailable for legacy use. In FIG. 9B, we assume the elevation angles needed for UT 912 to communicate with satellites 910 to its east become low because of an unavailable satellite 916. Therefore, UT 912 will communicate with satellites 918 to its west at a satellite longitude of 84.5° W 920. UT 912 will continue to communicate with satellites 918 in orbits to its west even when satellite longitude is 87° W (relative to fixed UT coordinate)—elevation angle is still approximately 45° W. The UT 912 then switches to satellites to its east when satellite longitude is approximately 72° W and the elevation angle is above 45 degrees. There is minimal or no impact to user terminals using a legacy air interface when one satellite in orbit is declared unavailable in northern latitudes and there still exists at least one satellite that is still available at approximately 45 degree elevation angle or above.

Figure 10:
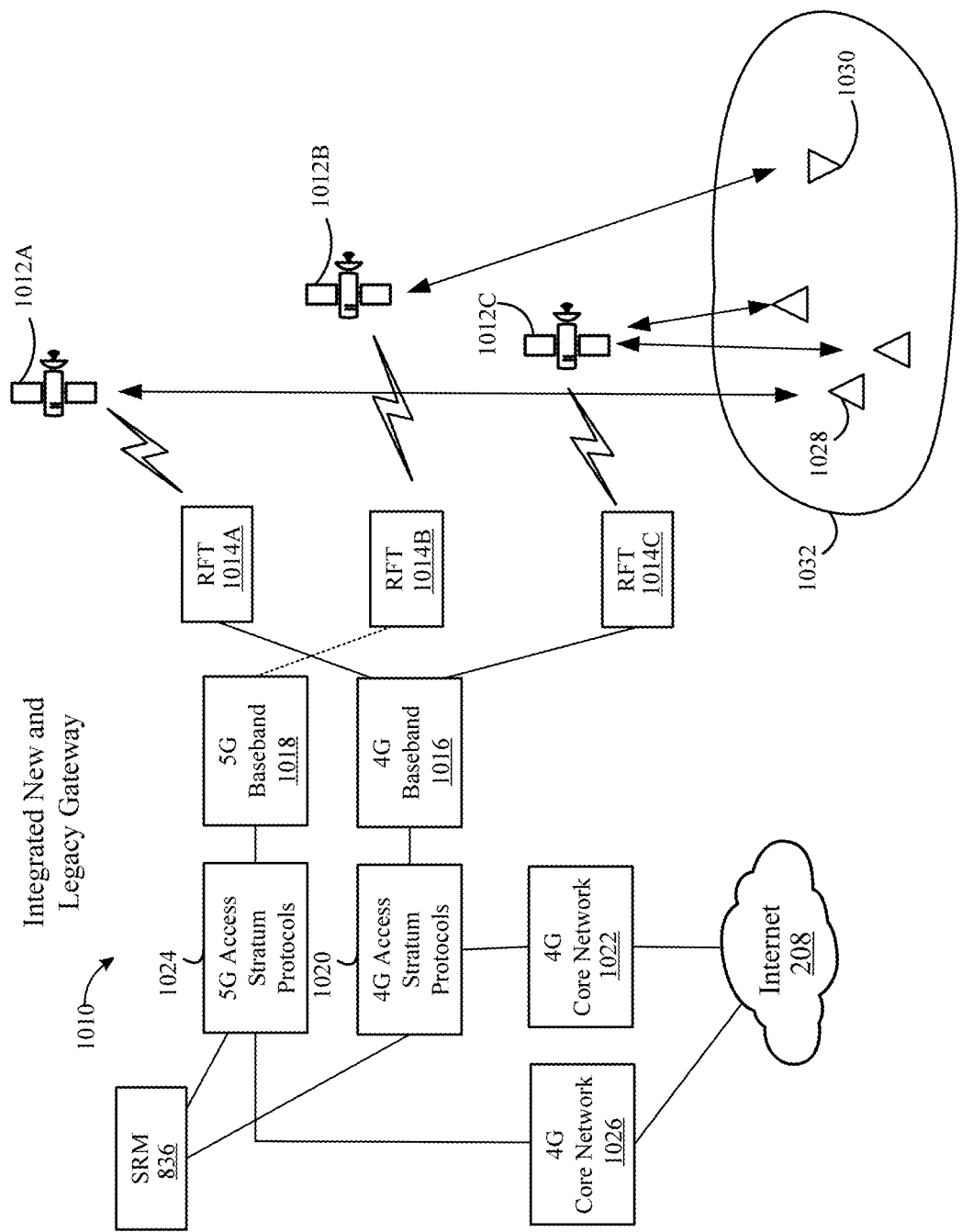
FIG. 10 illustrates an integrated system which communicates with legacy and new protocols and air interface systems.
Figure 11:
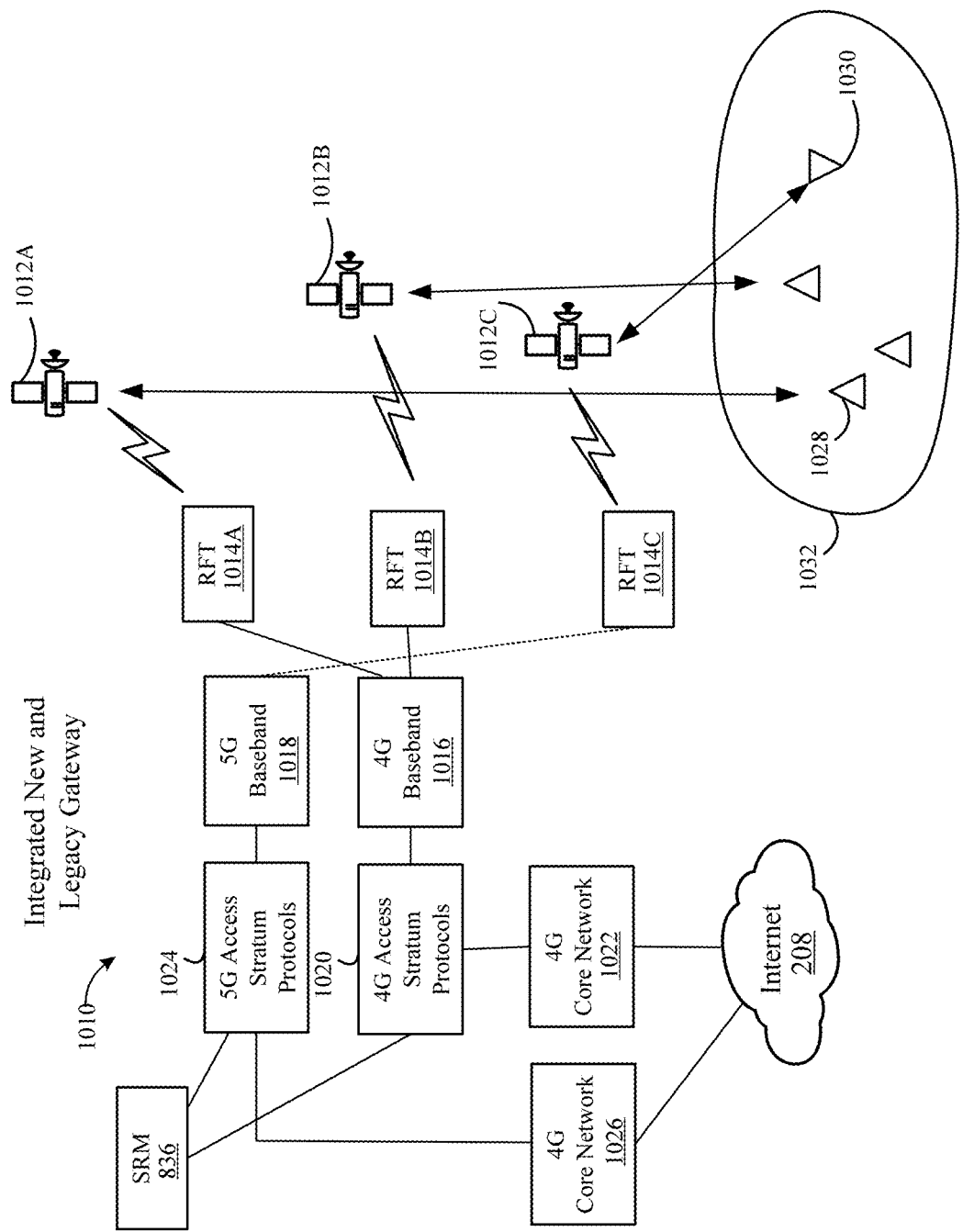
FIG. 11 illustrates the same integrated 4G/5G gateway and system as shown in FIG. 10 at a different point in time.

FIGS. 10 and 11 illustrate examples of satellite sharing for satellite level transitioning. FIG. 10 illustrates an integrated system which communicates with legacy and new protocols and air interface systems. In the illustrated example, the integrated satellite system includes an integrated 4G/5G gateway 1010 that communicates with satellites 1012. The integrated 4G/5G gateway 1010 includes a number of radio frequency transmitters (RFTs) 1014A-1014C (collectively referred to as RFTs 1014) that communicate with the satellites 1012A-1012C (collectively referred to as satellites 1012). The RFTs 1014 communicate with a 4G baseband module 1016 and a 5G baseband module 1018. The 4G baseband module 1016 communicates with 4G access stratum protocols 1020 with a 4G core network 1022. The 5G baseband module 1018 communicates with 5G access stratum protocols 1024 with a 5G core network 1026. The 4G core network 1022 and the 5G core network 1026 are also connected to the internet 822 to provide internet access to user terminals 1028 and 1030, in the region 1032, communicating with the satellites 1012. FIG. 11 illustrates the same integrated 4G/5G gateway and system as shown in FIG. 10 at a different point in time as described below.

In satellite level transitioning with satellite sharing, the 5G gateway is shared with RFT and antenna of 4G Gateway. The satellite resource manager 836 assigns satellites to 4G or 5G service depending on the satellite location. At any instant of time, a satellite is assigned to either 4G service or 5G service. FIG. 10 illustrates the integrated satellite system with the integrated 4G/5G gateway 1010 communicating with satellites 1012 at a first time T=0. At time T=0, the SRM 836 has set the 4G baseband 1016 to communicate with the RFT 1014A and RFT 1014C, which communicate with satellites 1012A and 1012C respectively connected to legacy user terminals 1028. The SRM 836 has also set the 5G baseband 1018 to communicate with the RFT 1014B which communicates with satellite 1012B connected to the new user terminal 1030. FIG. 11 illustrates the integrated satellite system with the integrated 4G/5G gateway 1010 communicating with satellites 1012 at a second time T=1. At time T=1, the SRM 836 has set the 4G baseband 1016 to communicate with the RFT 1014A and RFT 1014B, which communicate with satellites 1012A and 1012B, respectively, connected to legacy user terminals 1028. The SRM 836 has also set the 5G baseband 1018 to communicate with the RFT 1014C, which communicates with satellite 1012B connected to the new user terminal 1030 using a new communication service (5G) and new protocols. As illustrated in FIG. 10 and FIG. 11, the satellite resource manager 836 can assign satellites to 4G or 5G service depending on the satellite location to service user terminals using 4G or 5G protocols and air interfaces to facilitate satellite level transitioning. The satellites can be shared to service legacy and new user terminals.

Transition from legacy satellite systems to new satellite systems may further be facilitated with carrier level transition. An example of carrier level transition includes both legacy and new user terminals co-existing in the system and sharing satellite and beam resources. In forward link, the legacy gateway would transmit as though the satellite forward link was duty-cycled with a portion of the forward link time dedicated to the legacy gateway. During the remaining portion of the 1 ms burst, a new gateway would transmit in the forward link. Examples of multiplexing in the forward link are shown in FIGS. 12A through 12C and described further below.

Figure 12A:
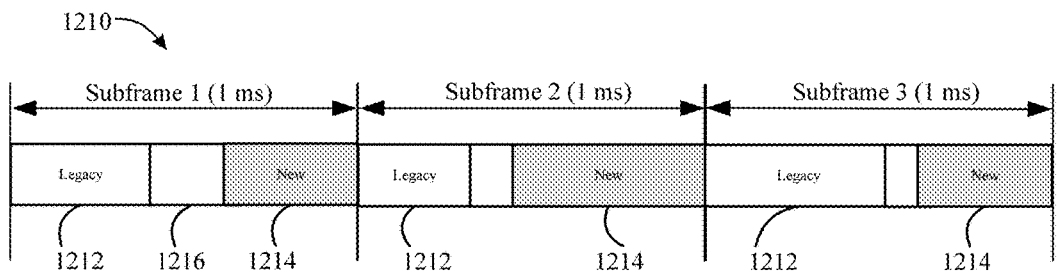
FIG. 12A illustrates an example of facilitating carrier level transition using time multiplexing of legacy and new user data on the forward link.

FIG. 12A illustrates an example of facilitating carrier level transition using time multiplexing of legacy and new user data on the forward link. The forward link data 1210 is divided into 1 ms subframes, as described above and illustrated in FIG. 6A. For backward compatibility reasons, transmissions in forward link may be retained in 1 ms subframe boundaries as described above. The subframes for the forward link may be, for example, divided further at 0.1 ms starting at the subframe boundary. An integer multiple of 0.1 ms divisions may then be assigned to the legacy or new users. In the illustrated example, each of the subframes are divided into a legacy portion 1212, a new portion 1214 and an unused portion 1216. As shown in FIG. 12A, different sub-frames can have different time allocations for legacy and new waveforms.

Figure 12B:
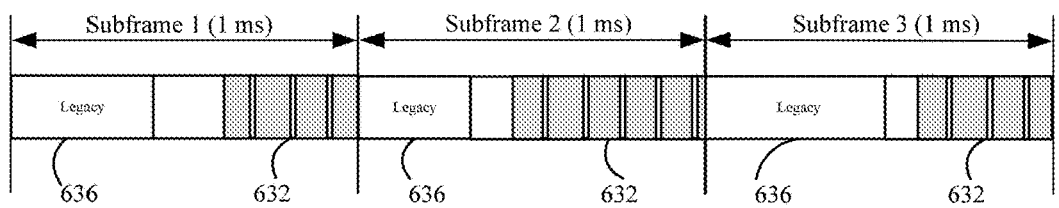
FIG. 12B illustrates another example of facilitating carrier level transition using time multiplexing of legacy and new user data on the forward link.

FIG. 12B illustrates another example of facilitating carrier level transition using time multiplexing of legacy and new user data on the forward link. There may be certain legacy satellite implementations where duty cycling is supported in the satellite and the receiver detects energy in a subframe and then looks for a reference signal. In this situation, the legacy receiver in the user terminal will attempt to demodulate the entire sub-frame, when there is energy in the entire sub-frame even if a portion is dedicated to a new system. If a portion of the frame has been allocated to a new system, the legacy system could generate an error if no reference symbol is found. Under these situations, reference symbols of legacy waveform can be inserted into remaining portions of the forward frame used to carry user data for the new system. The purpose of these reference signals in the new portion of the forward frame is to mitigate errors in a legacy receiver that may also be processing this waveform. The spacing of reference signals depends on the anticipated timing and frequency variation with a 1 ms subframe. For example, a 1 ms subframe could have reference signals spaced at about 0.1 ms intervals. In the example shown in FIG. 12B, each 1 ms subframe includes a legacy portion 1212 with a new portion 1214. The new portion 1214 includes a number of reference signals added in the new portions 1214 to prevent errors in the legacy receivers as described above.

Figure 12C:
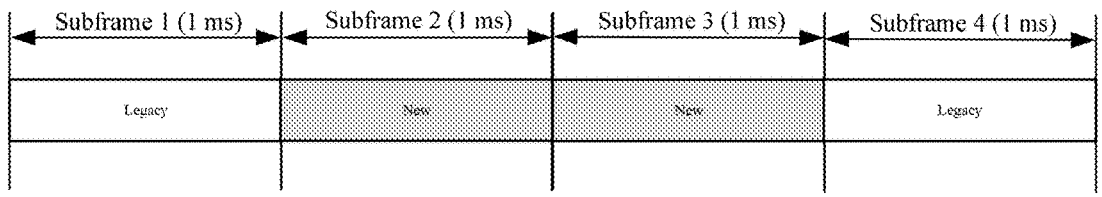
FIG. 12C illustrates another example of facilitating carrier level transition using time multiplexing of legacy and new users on the forward link.

FIG. 12C illustrates another example of facilitating carrier level transition using time multiplexing of legacy and new users on the forward link. In certain systems where duty cycling is not supported, it is still possible for multiplexing legacy and new user terminals across complete sub-frames. In order to improve the efficiency of transmission, a scheduler in gateway buffers data belonging to new and legacy users and transmits them in individual subframes as shown in FIG. 12C. In the example illustrated in FIG. 12C, after a first legacy subframe 1220, two new full 1 ms subframes 1222 are allocated to new systems. The amount of buffering can depend on delay tolerance of the individual session. Delay intolerant traffic will be buffered less and delay tolerant traffic will be buffered more. The decision by scheduler is dynamic—therefore the user terminals will not know ahead of time whether a subframe will carry data for new or legacy user terminals. Waveform design for new and old UT is such that CRC will fail when one generation UT attempts to receive waveform of another generation.

Figure 13:
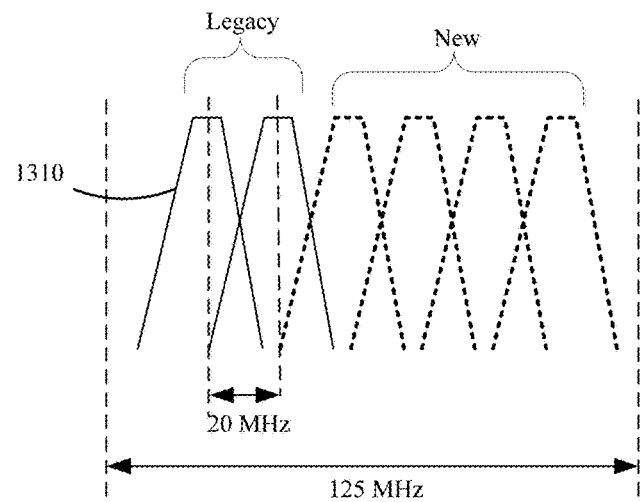
FIG. 13 illustrates another example of facilitating carrier level transition using return link multiplexing.

FIG. 13 illustrates another example of facilitating carrier level transition using return link multiplexing. The return link uses 20 MHz carriers in a beam as described above with reference to FIGS. 4 and 5. As shown in FIG. 4, there are typically 6 carriers in each 125 MHz band. To facilitate carrier level transition, the carriers can be shared by the new and legacy gateways. In the return link, a legacy gateway could use N (N=1 to 6) out of six 20 MHz carriers in a beam. The remaining (6−N) 20 MHz carriers could be used by a new gateway. In the illustrated example, two carriers 1312 are allocated to legacy gateways and four carriers 1314 are allocated to new gateways. Similar to forward link, the number of carriers used for legacy and new systems can be time-varying. Multiplexing of legacy and new waveforms can be in both frequency and time domains. This type of dynamic resource sharing allows a seamless and smooth phasing out of legacy user terminals and phasing in of new user terminals.

Figure 14:
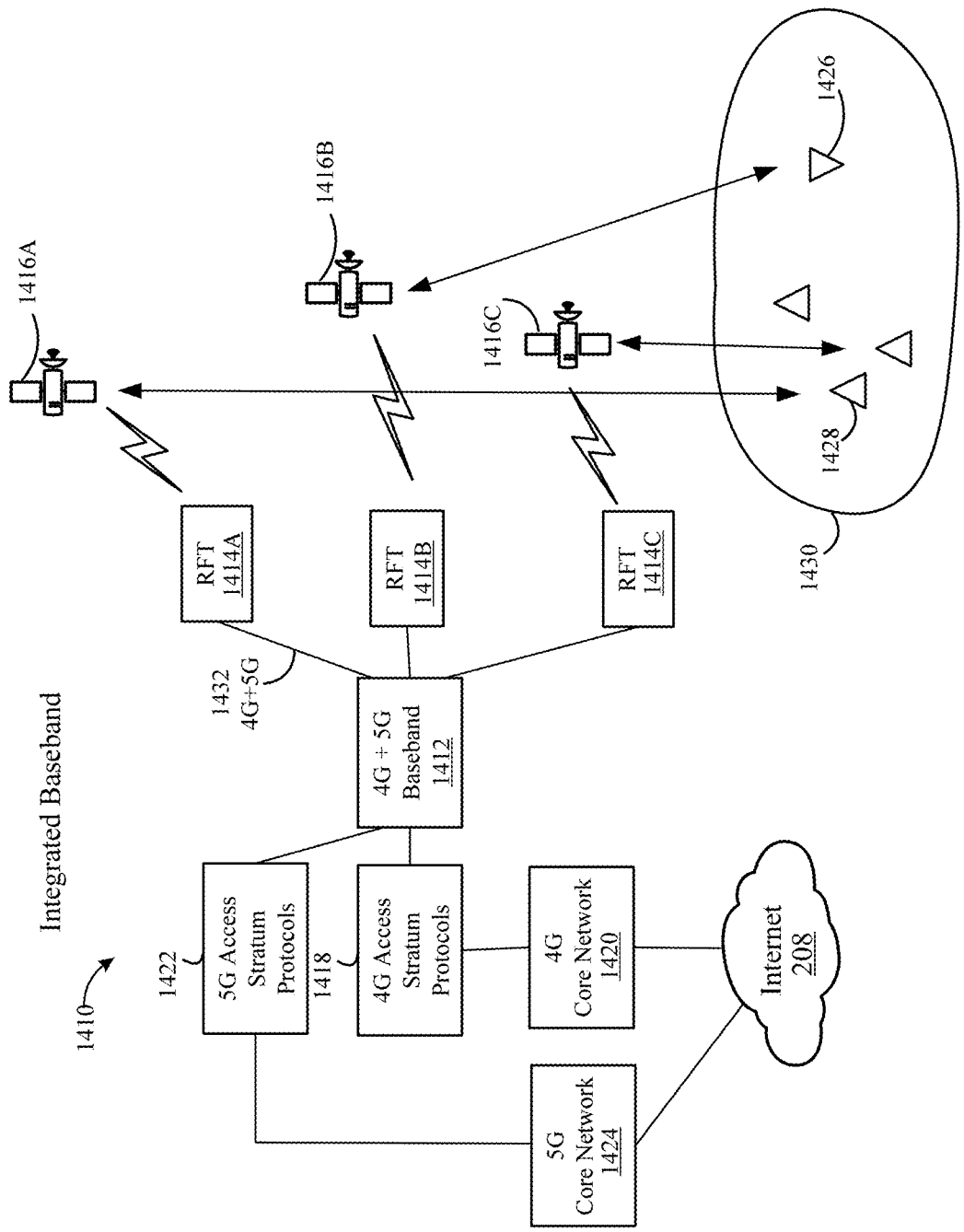
FIG. 14 illustrates another example of facilitating carrier level transition using an integrated 4G and 5G baseband function.

FIG. 14 illustrates another example of facilitating carrier level transition using an integrated 4G and 5G baseband function. This example of carrier level transition includes an integrated 4G/5G gateway 1410 which includes both legacy and new user terminals co-existing in the system and sharing satellite and beam resources. In the example of FIG. 14, the system communicates with legacy and new protocols and air interface systems using an integrated 4T and 5G baseband function 1412. The integrated 4G/5G gateway 1410 further includes a number of radio frequency transmitters (RFTs) 1414A-1414C (collectively referred to as RFTs 1014) that are also integrated with 5G functionality. The integrated RFTs 1414 communicate with the satellites 1416A-1416C (collectively referred to as satellites 1416). The integrated RFTs 1414 communicate with the integrated 4G/5G baseband module 1412. The integrated 4G/5G baseband module 1412 communicates with 4G access stratum protocols 1418 with a 4G core network 1420. The integrated 4G/5G baseband module 1412 also communicates with 5G access stratum protocols 1422 with a 5G core network 1424. The 4G core network 1420 and the 5G core network 1424 are also connected to the internet 822 to provide internet access to user terminals 1426, 1428, in the region 1430, communicating with the satellites 1416. In this example, the 5G gateway is integrated with Radio Frequency Terminal (RFT) and antenna of 4G gateway. In addition, baseband functions of 5G and 4G are integrated into the 4G/5G baseband functions such that at any instant of time, a satellite may be assigned to both 4G service and 5G service. The integrated 4G/5G baseband module 1412 communicates with the RFTs 1414 using 4G or 5G air interface and protocols and to the satellites 1416, which may further communicate with legacy user terminals 1426 and new user terminals 1428.

The present disclosure provides MAC layer enhancements for an air interface of a satellite system such as a 5G based system. The MAC layer enhancements may be accomplished primarily by the MAC layer 1500 in FIG. 15. The MAC layer 1500 includes the protocol blocks 142, 148, 232, 238 described above with reference to FIG. 1 and the UT protocol stacks. The MAC layer 1500 may include a scheduler that allows resource aggregation by allocating additional radio resources to users on one beam using carriers allocated to adjacent beams. This resource aggregation does not require multiple carriers to be allocated to each beam. The MAC layer enhancements may also provide user terminals the ability to report their "battery" head room where the scheduler may then take into account battery status of a user terminal. For example, the scheduler can act to conserve UT battery but still maintain connectivity with network as described further below. A dynamic link adaptation block in the MAC layer determines optimal coding scheme for downlink map and uplink map information. Further, the MAC layer 1500 may provide speculative uplink grants to user terminals to allow user terminals to transmit on uplink without explicitly requesting resources to help improve application layer throughputs of user sessions.

Figure 15:
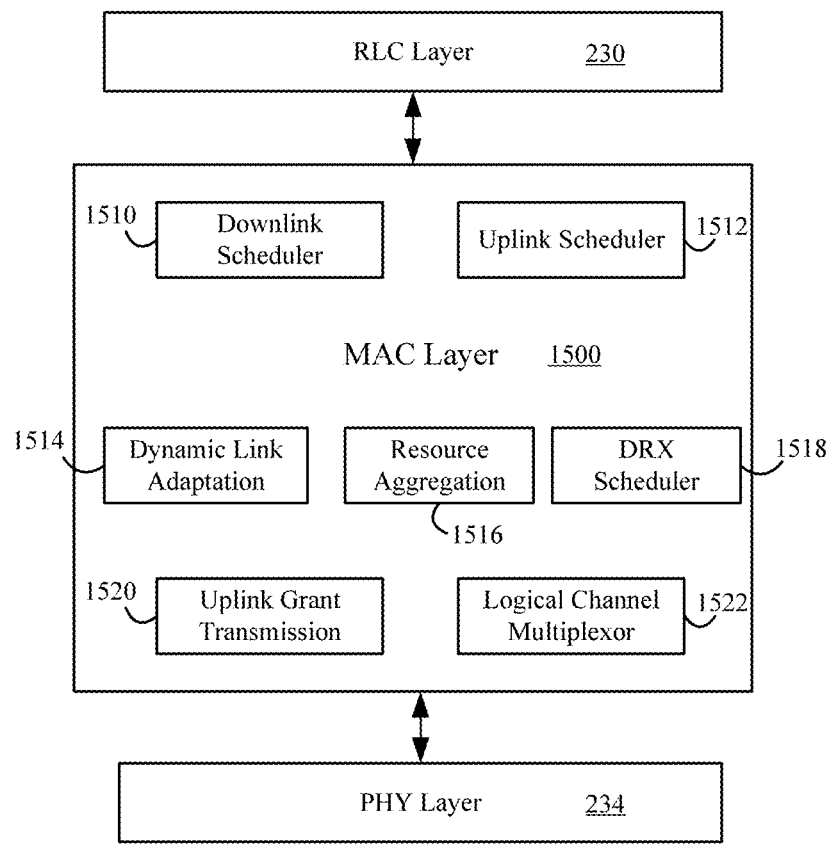
FIG. 15 is a block diagram illustrating an example MAC layer.

FIG. 15 is a functional block diagram illustrating an example MAC layer 1500. The MAC layer 1500 in this example is part of the UT protocol stack 110 such as MAC layer block 148 shown in FIG. 1. The MAC layer 1500 communicates with the RLC layer 230 and the PHY layer 234 in the UT protocol stack as described above. The MAC layer 1500 may be divided into the following logical blocks: downlink scheduler 1510, uplink scheduler 1512, dynamic link adaptation 1514, resource aggregation block 1516, discontinuous reception (DRX) scheduler 1518, uplink grant transmission 1520, and logical channel multiplexor 1522. The downlink scheduler 1510 of the MAC layer 1500 schedules transmission of packets towards user terminals based on a number of criteria, including relative priority of users, quality of service requirement etc. The uplink scheduler 1512 of the MAC layer 1500 schedules transmission of packets from user terminals based on a number of criteria, including demand, relative priority of users, quality of service requirements, etc.

The MAC layer 1500 further includes a dynamic link adaptation block 1514 that determines the modulation and coding scheme to be used for uplink and downlink transmissions based on channel quality. MAC layer 1500 may also determine the transmit power from user terminals. The resource aggregation block 1516 provides MAC layer 1500 the ability to schedule across multiple carriers in the same beam. The DRX scheduling block 1518 in the MAC layer 1500 determines the times at which a user terminal would be awake and only transmit to the user terminal when it is awake. The uplink grant transmission block 1520 in the MAC layer 1500 informs user terminals about the time and frequency slots in which user terminals can transmit so that two user terminals do not transmit on the same frequency slot and/or the same time-slot. The uplink grant transmission 1520 also indicates the power and modulation and cooling (MODCOD) with which a user terminal is expected to transmit. The logical channel multiplexing block 1522 of the MAC layer 1500 multiplexes multiple logical channels into a PHY layer burst.

Figure 16:
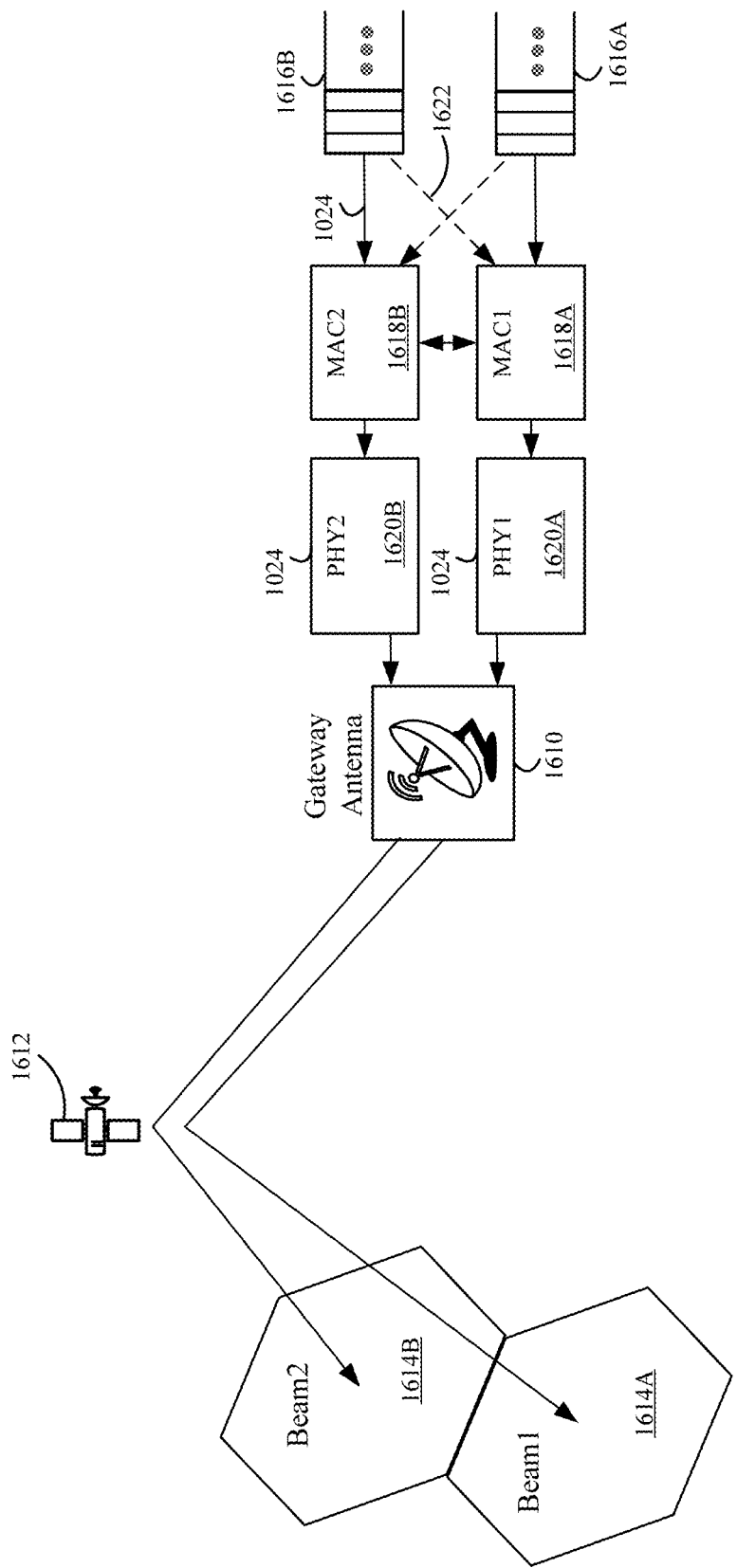
FIG. 16 illustrates an example of beam aggregation in a satellite communication system.

FIG. 16 illustrates an example of beam aggregation in a satellite communication system. The satellite system shown in FIG. 16 includes a gateway antenna 1610 that communicates with a satellite 1612. The satellite 1612 communicates with UTs in one of many beams of the satellite (or sometimes referred to as cells such as in terrestrial cellular systems). The illustrated example shows two beams for simplicity, namely, beam1 1614A and beam2 1614B, which are collectively referred to as beams 1614. The beams 1614 operate at different frequencies. There is a corresponding queue and an associated MAC scheduler for each beam. In the illustrated example, the queue 1616A feeds a MAC block 1618A with a first scheduler (down link scheduler 1510 shown in FIG. 15). The MAC1 block 1618A feeds a first PHY block 1620A connected to the gateway antenna 1610. Similarly, queue 1616B feeds a MAC2 block 1618B with a second scheduler (not shown). The MAC2 block 1618B feeds a PHY2 block 1620B which is also connected to the gateway antenna 1610. Packets belonging to users in beams 1614 are buffered in their appropriate queues and scheduling is performed by the corresponding MAC schedulers and transmitted on carriers designated for the individual beams. Gateway MAC layer scheduling (resource allocation) for a user is based on carriers used in that beam. Typically, at any one time, a given user belongs to one of the satellite beams.

Figure 17A:
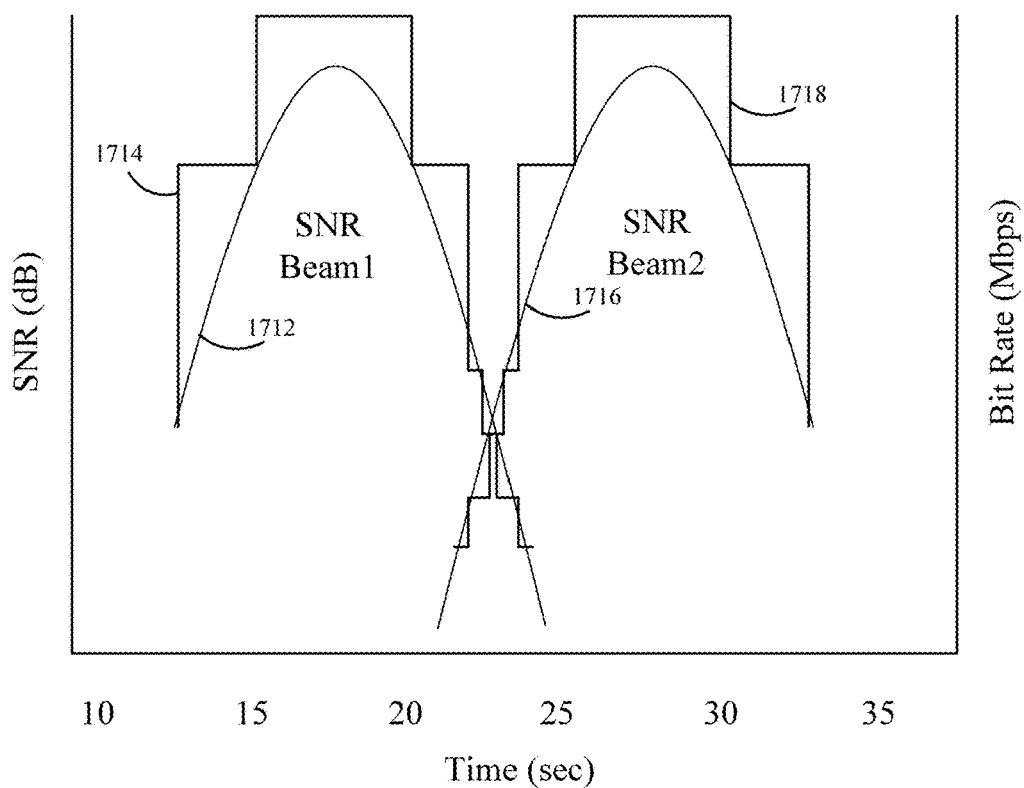
FIG. 17A illustrates data performance and signal to noise ration depending on the location of the user in a beam without beam aggregation.

FIG. 17A illustrates data performance and SNR depending on the location of the user in a beam without beam aggregation. Throughput data performance that a user can achieve depends on the signal to noise ratio (SNR). The SNR depends on the location of the user, specifically whether the user is at the center of beam or edge of beam. A user at center of beam typically achieves higher throughput than edge, since the beam response (and therefore Signal to Noise Ratio) drops off towards the edge of beam. In NGSO systems, it is possible that even if the user is stationary, the movement of the satellite on top of the user makes the user be in center and edge as a function of time. The example shown in FIG. 17A depicts the SNR of beam1 1712 with a bit rate 1714, and a second beam2 1716 with a corresponding bitrate 1718 as it changes over time, where time relates the position of a user in the beams of a moving satellite. At around 17 seconds, the UT is at the center of beam1 1712 and enjoys a higher SNR and therefore higher throughput. As the satellite moves, the UT is near beam edge (at around 23 seconds) and SNR (and therefore throughput) drops. As the satellite further moves, the UT comes under the center of beam2 1716 around 28 seconds and throughput is high again.

As can be seen in FIG. 17A, the bitrate available to the UT varies significantly over time as the beam moves over the UT. One option to overcome the inconsistent bitrate is to increase the number of carriers in each beam and allocate resources on multiple carriers (sometimes called carrier aggregation) to improve throughput performance. However, this option requires more frequency spectrum to be available which is not always possible. The instant disclosure and claims herein are directed to a system and method for beam aggregation where carriers from adjacent beams are used to improve performance of UTs at a beam's edge. The system exploits the fact that in satellite systems, the adjacent beam response drops off more gradually into the current beam. This method of beam aggregation does not need to allocate multiple carriers (carrier aggregation) to each beam to increase throughput performance.

Figure 17B:
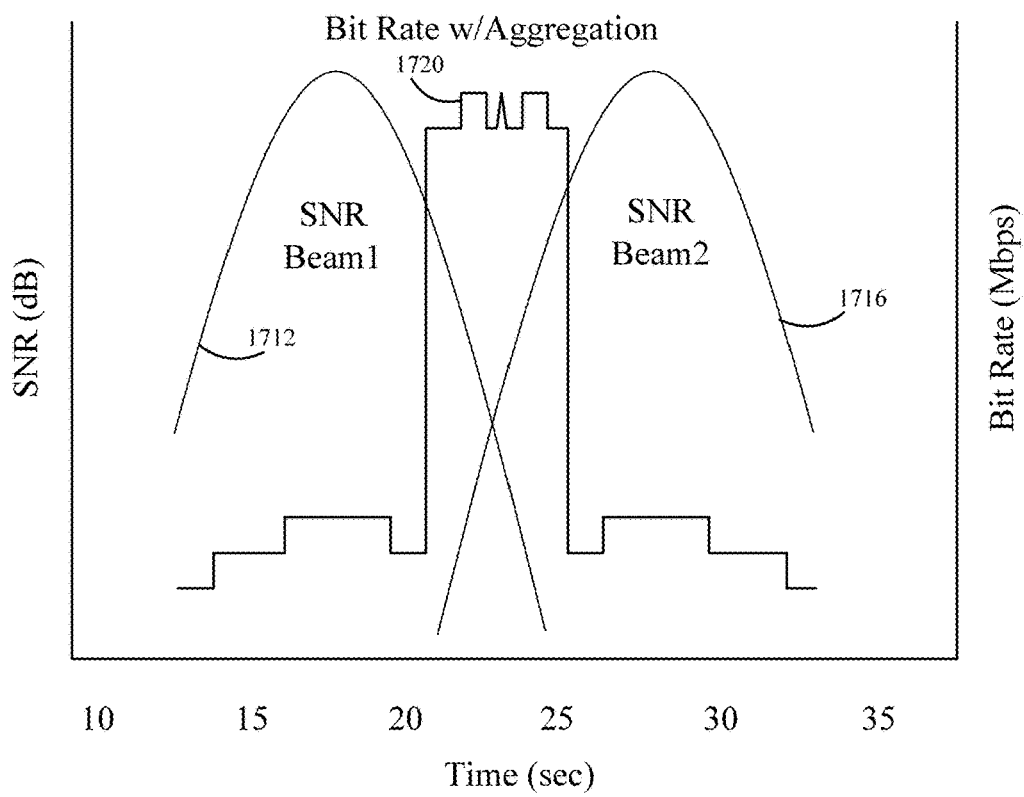
FIG. 17B illustrates data performance and SNR depending on the location of the user in a beam with beam aggregation.

FIG. 17B illustrates data performance and SNR depending on the location of the user in a beam with beam aggregation as described herein. Aggregation of resources as described herein can provide a more consistent throughput performance regardless of the location of the user in the beam as shown in FIG. 17B. In the example shown in FIG. 17B, at around 21 seconds, the UT is under beam1 1712 (since at that time beam1's response is higher than beam2 1716). However, beam2 1716 response at that time is quite comparable to that of beam1 1712. In such cases, the scheduler can schedule this user on carriers used on beam 1 as well as beam 2 to improve throughput for this user. FIG. 17B shows the improvement in throughput achieved by an aggregation bit rate 1720 when a UT is near the beam edges and the beam resources are aggregated. In contrast, FIG. 17A shows the throughput without aggregation.

FIG. 16 further illustrates aggregating a user on adjacent carriers to improve throughput for the user. A user packets in beam1 queue 1616A are fed to beam2 scheduler in MAC1 1618A in addition to beam1 scheduler in MAC2 1618B. In order to effectively aggregate user packets, MAC layers of Beam 1 and Beam 2 communicate with each other about the load that each one sees from their individual queue. When a packet from beam 1 queue is provided to Beam 2 scheduler, MAC layer of Beam 2 informs whether those packets were indeed scheduled in that sub-frame. If not, that packet goes back to Beam 1 queue for scheduling in the next sub-frame. Interaction 1622 between MAC layers of Beam 1 and Beam 2, as well as packet transfer from Beam 1 queue to Beam 2 scheduler and vice versa are illustrated in FIG. 16. The corresponding logic for aggregation is shown in the flowchart of FIG. 18 and described below.

Figure 18:
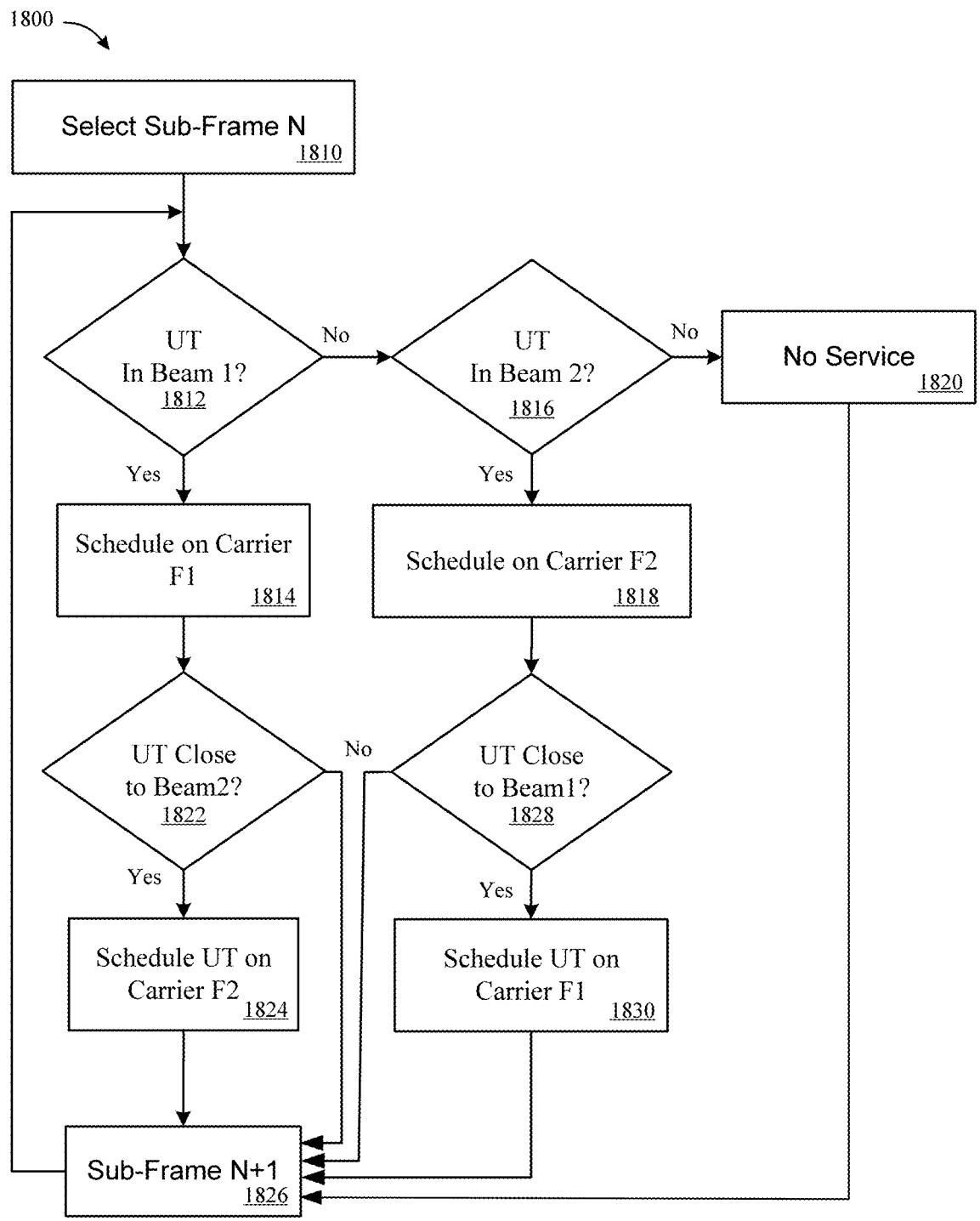
FIG. 18 is a flow diagram of a process or method for beam aggregation as described herein.

FIG. 18 is a flow diagram of a process or method 1800 for beam aggregation as described herein. Operations in the example method 1800 are primarily performed by the schedulers in the MAC layer 1500 but may also be performed by other various entities in the system. This flow diagram is only for purposes of example and is not intended as a limitation regarding implementations and practices in accordance with this disclosure. Method 1800 begins by first, selecting a sub-frame "N" that represents the current sub-frame in the system for which user data transmission is to be scheduled (step 1810). For sub-frame N, if the UT to be scheduled is in beam 1 (step 1812=yes) then method 1800 proceeds to schedule the UT on carrier F1 (step 1814). If not (step 1810=no), then method 1800 checks to determine if the UT is in beam 2 (step 1816). If the UT is in beam 2 (step 1816=yes), then the method proceeds to schedule the UT on carrier F2 (step 1818). If not (step 1810=no), then no service is available (step 1820) and method 1800 increments the sub-frame (step 1826) and then returns to step 1810 to check for subsequent sub-frames. After scheduling the UT on carrier F1 (step 1814), method 1800 proceeds to determine if the UT is close to beam 2 (step 1822). When it is determined that the UT is close to beam 2 (step 1822=yes), then the method proceeds to schedule the UT on carrier F2 (step 1824), increment the sub-frame (step 1826) and return to checking beams (step 1812). After scheduling the UT on carrier F2 (step 1818), method 1800 proceeds to determine if the UT is close to beam 1 (step 1828). If the UT is close to beam 1 (step 1828=yes), then the method proceeds to schedule the UT on carrier F1 (step 1830), increment the sub-frame (step 1826) and return to checking beams (step 1812). If the UT is not close to the opposite beam (step 1822, 1828=no), then the sub-frame incremented (step 1826) and the method returns to checking beams (step 1812).

Figure 19:
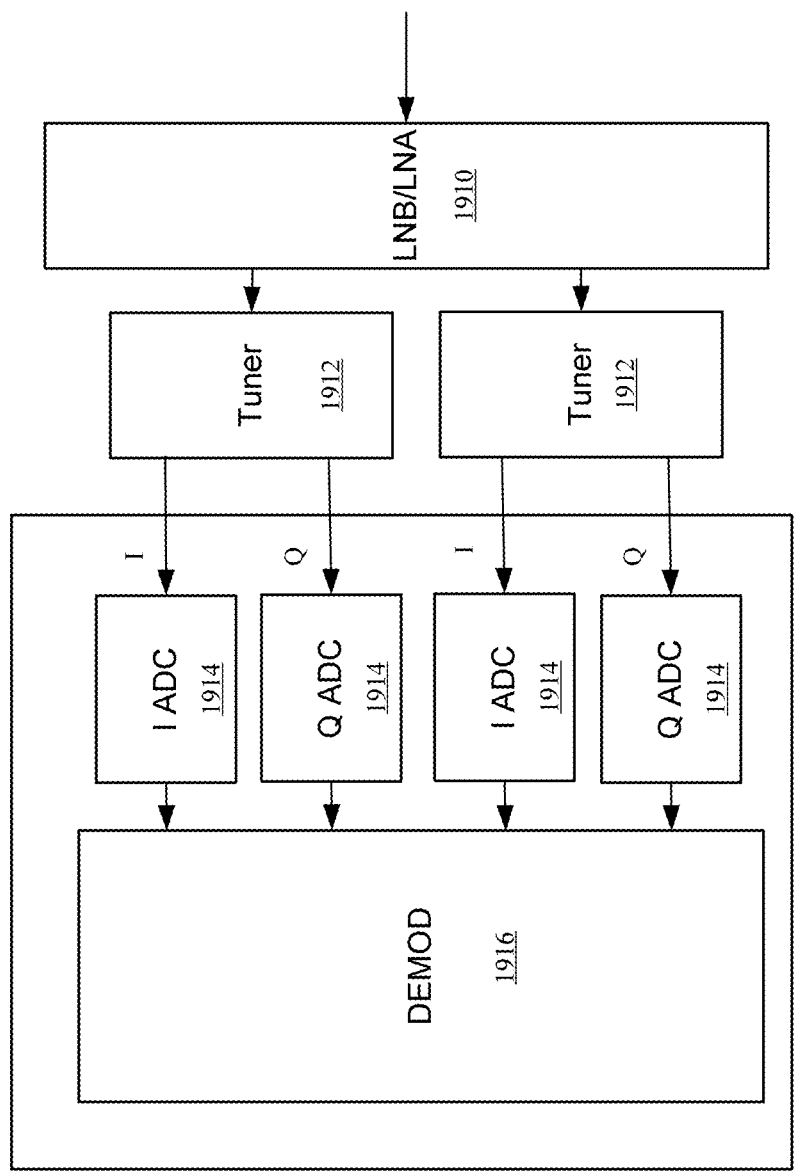
FIG. 19 is a block diagram of multiple receivers used for resource aggregation as described herein.

FIG. 19 is a block diagram of multiple receivers used for resource aggregation as described herein. Both types of resource aggregation, carrier and beam aggregation, require multiple receivers in the user terminal. Such a user terminal may comprise of a wideband Low Noise Amplifier (LNA) or Low Noise Block (LNB) 1910 followed by multiple different tuners 1912. Two tuners 1912 are shown in the illustrated example. Each tuner is capable of tuning to a different carrier frequency belonging to the same beam or two adjacent beams. Output of each tuners 1912 is digitized using an Analog to Digital Converter (ADC) 1914 before being processed by the demodulator (DEMOD) 1916 in user terminal. The ADCs 1914 may operate on In-phase (I) and Quadrature (Q) components of the received signal as shown. The MAC layer 1500 in the network instructs this user terminal to operate on multiple carrier frequencies and schedules user data on multiple carriers accordingly as described above.

Figure 20:
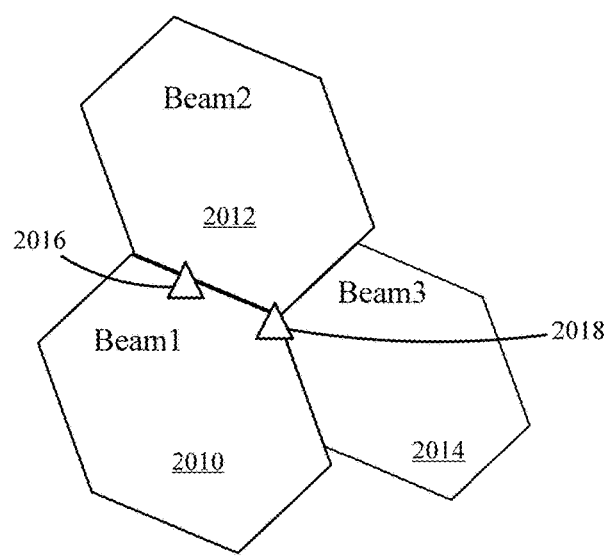
FIG. 20 is a block diagram showing resource aggregation on multiple beams.

FIG. 20 is a block diagram showing resource aggregation on multiple beams. In the descriptions and figures above, resource aggregation, both carrier and beam aggregation, were shown with just two beams. The same concepts above can be applied to three or more beams. Similarly, the above concepts can be applied to uplink (in the direction from the user terminal to the gateway) as well as down link. As shown in FIG. 20, user terminals may be located at a point in time near the intersections of three beams, beam1 2010, beam2 2012 and beam3 2014. In this example, user terminal 2016 is near the intersection of beam1 2010 and beam2 2012. Similarly, user terminal 2018 is near the intersection of beam1 2010, beam2 2012 and beam3 2018. As will be evident to one of ordinary skill in the art, the descriptions and method flow in FIG. 18 can be modified to accommodate multiple beams as shown in FIG. 20.

A typical user terminal in high throughput systems constantly listens to downlink signals from the satellite to determine if there is any data for it. This can be very detrimental to user terminals that are battery operated or solar powered. This is because a significant amount of battery power is consumed even when there is no data to that terminal. This power consumption is particularly high for a user terminal that has an Active Electronically Steered Array (AESA) where the phase shifter chips consume a significant amount of power even during receive. One option is to force battery operated user terminals to operate in DRX mode. In DRX mode, the user terminal sleeps (turn off electronics) for a predetermined duration and wake up for a brief duration (again predetermined) to check if it has data for it and then go back to sleep. However, this method will impair throughput for this terminal regardless of its battery status.

Figure 21:
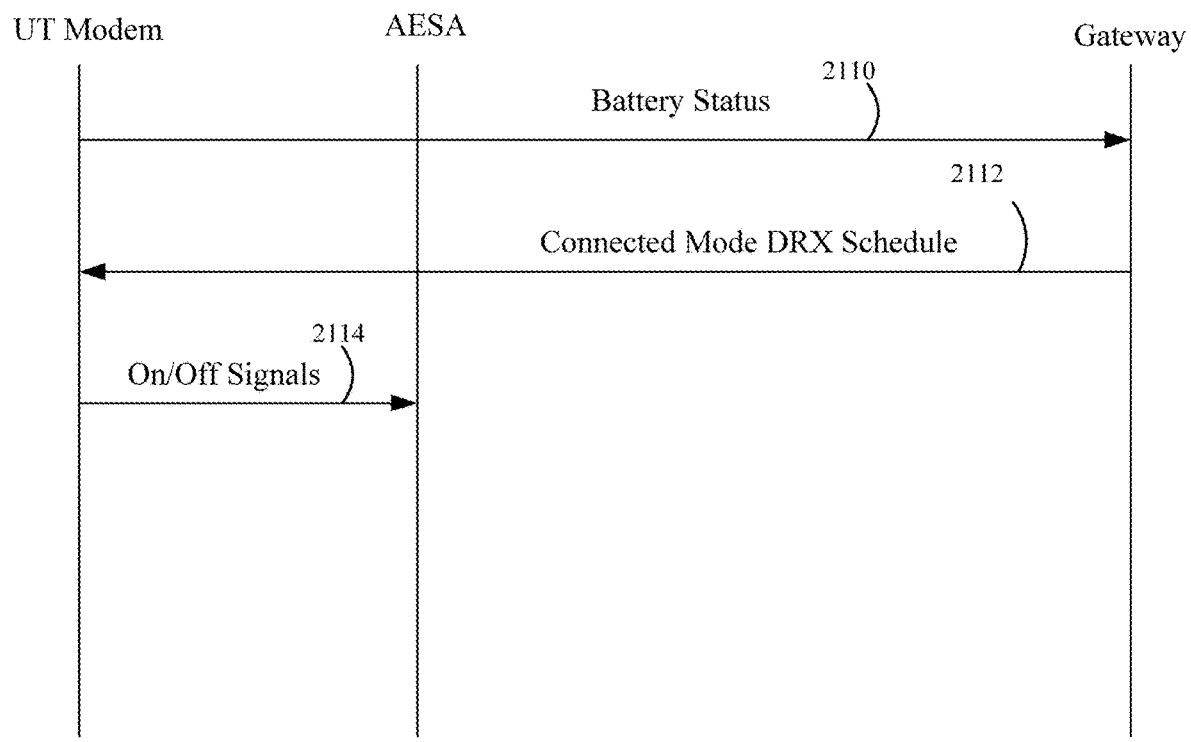
FIG. 21 illustrates user terminal communication for downlink scheduling based on terminal capability and UT battery status to reduce power consumption.

FIG. 21 illustrates user terminal communication for downlink scheduling based on terminal capability and UT battery status to reduce power consumption. As shown in FIG. 21, UT informs the battery status 2110 to the gateway. This status may be conveyed from the user terminal to the gateway via a MAC layer control message. Depending on battery status, the gateway dynamically determines the DRX parameters (sleep duration, wake up time and duration, etc.) and provides it to user terminal 2112. Based on this DRX schedule, user terminal turns off all or portions of the terminal's electronics, including the AESA during sleep periods to conserve battery 2114. MAC scheduler only schedules communication with user terminals based on the DRX schedule. To further improve battery conservation, the Gateway MAC scheduler schedules those terminals with lower battery towards the beginning of the sub-frame. In this manner, user terminals can turn off electronics earlier than if data for this user terminal was scheduled later in the sub-frame as shown in FIGS. 22A and 22B.

Figure 22A:
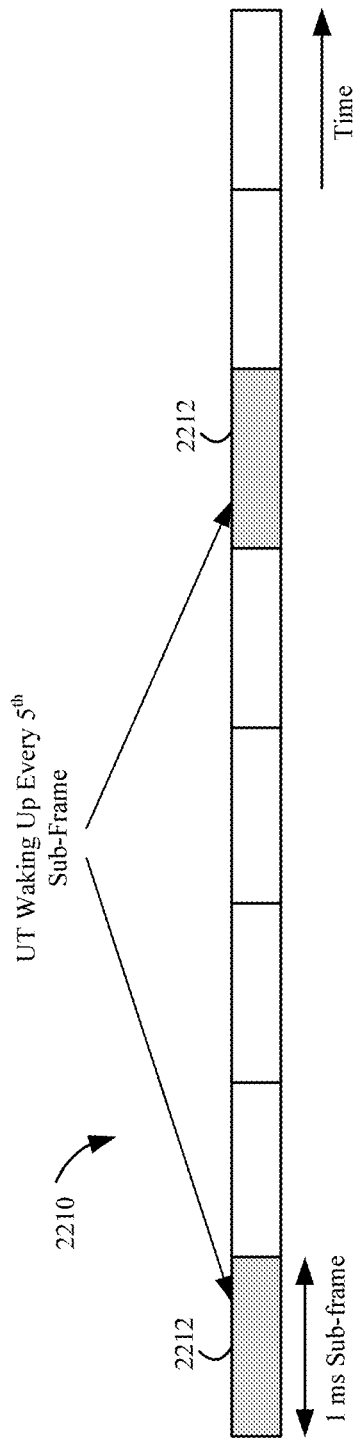
FIG. 22A illustrates an example of downlink scheduling to conserve a UT battery.
Figure 22B:
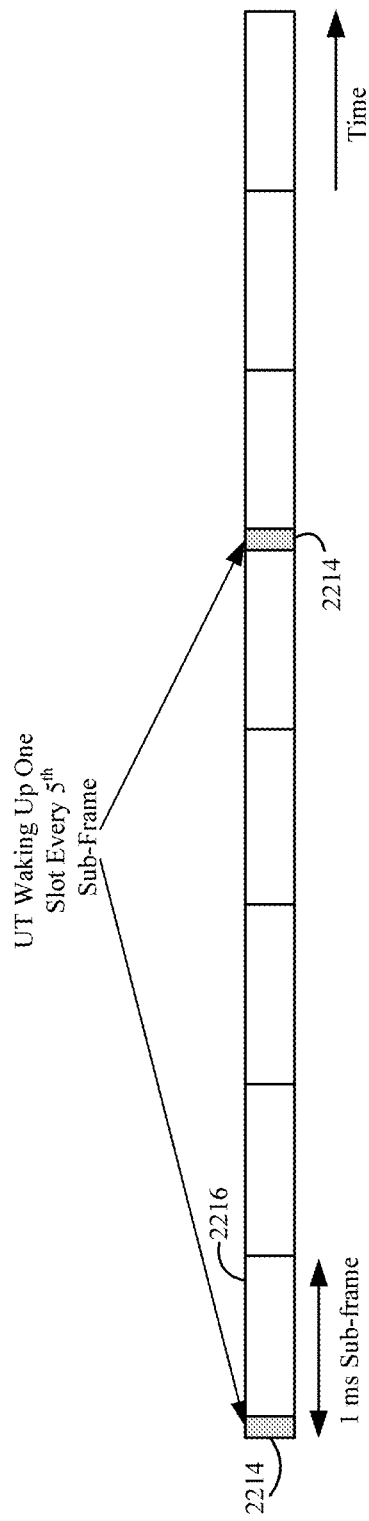
FIG. 22B illustrates another example of downlink scheduling to conserve a UT battery.

FIGS. 22A and 22B illustrates examples of downlink scheduling to conserve a UT battery. As described above, a user terminal can turn off all or portions of it's systems during at different times to conserve battery 2114. In the illustrate examples, the user terminal shuts down and then wakes up for specific sub-frames or portions of sub-frames. For example, the user terminal may wake up every N sub-frames, where N is an integer greater than 1. FIG. 22A illustrates a forward link sub-frame structure 2210 as described above with reference to FIG. 6. In this example, a user terminal wakes up ever fifth sub-frame 2212 of the forward link sub-frame structure 2210 to conserve battery power up to 80%. Similarly, FIG. 22B illustrates a forward link sub-frame structure 2210 where a user terminal wakes up for one 0.1 ms slot 2214 at the beginning of every fifth sub-frame 2216 of the forward link sub-frame structure to conserve battery power up to 98%.

The detailed examples of systems, devices, and techniques described in connection with FIGS. 1-22 are presented herein for illustration. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-22 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 23:
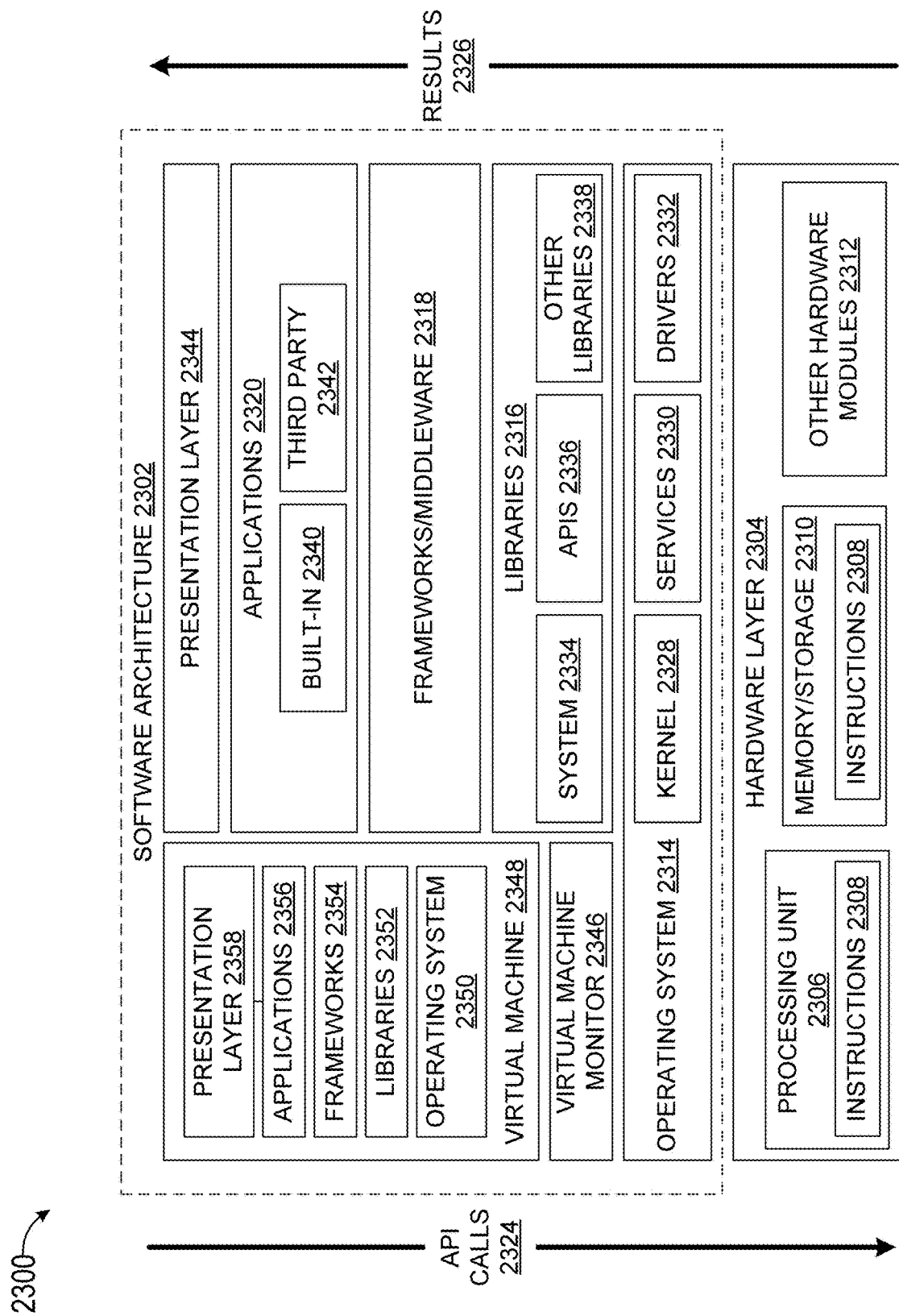
FIG. 23 is a block diagram showing an example software architecture, various portions of which may be used in conjunction with various hardware architectures herein described, which may implement any of the features described herein.

FIG. 23 is a block diagram 2300 illustrating an example software architecture 2302, various portions of which may be used in conjunction with various hardware architectures herein described, which may implement any of the above-described features. FIG. 23 is a non-limiting example of a software architecture and it will be appreciated that many other architectures may be implemented to facilitate the functionality described herein. The software architecture 2302 may execute on hardware such as a machine 2400 of FIG. 24 that includes, among other things, processors 2410, memory 2430, and input/output (I/O) components 2450. A representative hardware layer 2304 is illustrated and can represent, for example, the machine 2400 of FIG. 24. The representative hardware layer 2304 includes a processing unit 2306 and associated executable instructions 2308. The executable instructions 2308 represent executable instructions of the software architecture 2302, including implementation of the methods, modules and so forth described herein. The hardware layer 2304 also includes a memory/storage 2310, which also includes the executable instructions 2308 and accompanying data. The hardware layer 2304 may also include other hardware modules 2312. Instructions 2308 held by processing unit 2308 may be portions of instructions 2308 held by the memory/storage 2310.

The example software architecture 2302 may be conceptualized as layers, each providing various functionality. For example, the software architecture 2302 may include layers and components such as an operating system (OS) 2314, libraries 2316, frameworks 2318, applications 2320, and a presentation layer 2344. Operationally, the applications 2320 and/or other components within the layers may invoke API calls 2324 to other layers and receive corresponding results 2326. The layers illustrated are representative in nature and other software architectures may include additional or different layers. For example, some mobile or special purpose operating systems may not provide the frameworks/middleware 2318.

The OS 2314 may manage hardware resources and provide common services. The OS 2314 may include, for example, a kernel 2328, services 2330, and drivers 2332. The kernel 2328 may act as an abstraction layer between the hardware layer 2304 and other software layers. For example, the kernel 2328 may be responsible for memory management, processor management (for example, scheduling), component management, networking, security settings, and so on. The services 2330 may provide other common services for the other software layers. The drivers 2332 may be responsible for controlling or interfacing with the underlying hardware layer 2304. For instance, the drivers 2332 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 2316 may provide a common infrastructure that may be used by the applications 2320 and/or other components and/or layers. The libraries 2316 typically provide functionality for use by other software modules to perform tasks, rather than rather than interacting directly with the OS 2314. The libraries 2316 may include system libraries 2334 (for example, C standard library) that may provide functions such as memory allocation, string manipulation, file operations. In addition, the libraries 2316 may include API libraries 2336 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 2316 may also include a wide variety of other libraries 2338 to provide many functions for applications 2320 and other software modules.

The frameworks 2318 (also sometimes referred to as middleware) provide a higher-level common infrastructure that may be used by the applications 2320 and/or other software modules. For example, the frameworks 2318 may provide various graphic user interface (GUI) functions, high-level resource management, or high-level location services. The frameworks 2318 may provide a broad spectrum of other APIs for applications 2320 and/or other software modules.

The applications 2320 include built-in applications 2340 and/or third-party applications 2342. Examples of built-in applications 2340 may include, but are not limited to, a contacts application, a browser application, a location application, a media application, a messaging application, and/or a game application. Third-party applications 2342 may include any applications developed by an entity other than the vendor of the particular platform. The applications 720 may use functions available via OS 2314, libraries 2316, frameworks 2318, and presentation layer 2344 to create user interfaces to interact with users.

Some software architectures use virtual machines, as illustrated by a virtual machine 2348. The virtual machine 2348 provides an execution environment where applications/modules can execute as if they were executing on a hardware machine (such as the machine 2400 of FIG. 24, for example). The virtual machine 2348 may be hosted by a host OS (for example, OS 2314) or hypervisor, and may have a virtual machine monitor 2346 which manages operation of the virtual machine 2348 and interoperation with the host operating system. A software architecture, which may be different from software architecture 2302 outside of the virtual machine, executes within the virtual machine 2348 such as an OS 2314, libraries 2372, frameworks 2354, applications 2356, and/or a presentation layer 2358.

Figure 24:
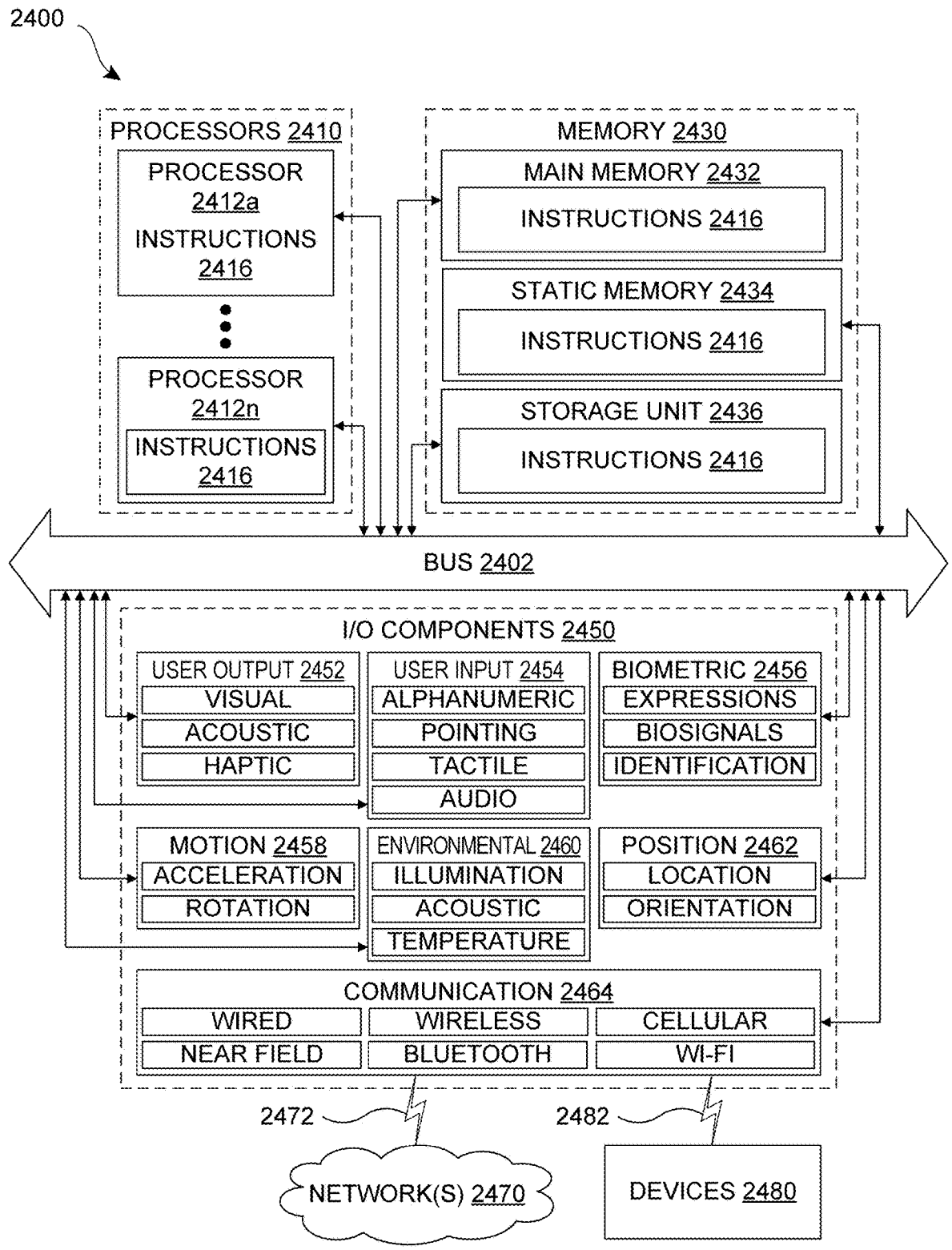
FIG. 24 is a block diagram showing components of an example machine configured to read instructions from a machine-readable medium and perform any of the features described herein.

FIG. 24 is a block diagram illustrating components of an example machine 2400 configured to read instructions from a machine-readable medium (for example, a machine-readable storage medium) and perform any of the features described herein. The example machine 2400 is in a form of a computer system, within which instructions 2416 (for example, in the form of software components) for causing the machine 2400 to perform any of the features described herein may be executed. As such, the instructions 2416 may be used to implement modules or components described herein. The instructions 2416 cause unprogrammed and/or unconfigured machine 2400 to operate as a particular machine configured to carry out the described features. The machine 2400 may be configured to operate as a standalone device or may be coupled (for example, networked) to other machines. In a networked deployment, the machine 2400 may operate in the capacity of a server machine or a client machine in a server-client network environment, or as a node in a peer-to-peer or distributed network environment. Machine 2400 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 2400 is illustrated, the term "machine" includes a collection of machines that individually or jointly execute the instructions 2416.

The machine 2400 may include processors 2410, memory 2430, and I/O components 2450, which may be communicatively coupled via, for example, a bus 2402. The bus 2402 may include multiple buses coupling various elements of machine 2400 via various bus technologies and protocols. In an example, the processors 2410 (including, for example, a central processing unit (CPU), a graphics processing unit (GPU), a digital signal processor (DSP), an ASIC, or a suitable combination thereof) may include one or more processors 2412*a* to 2412*n* that may execute the instructions 2416 and process data. In some examples, one or more processors 2410 may execute instructions provided or identified by one or more other processors 2410. The term "processor" includes a multi-core processor including cores that may execute instructions contemporaneously. Although FIG. 24 shows multiple processors, the machine 2400 may include a single processor with a single core, a single processor with multiple cores (for example, a multi-core processor), multiple processors each with a single core, multiple processors each with multiple cores, or any combination thereof. In some examples, the machine 2400 may include multiple processors distributed among multiple machines.

The memory/storage 2430 may include a main memory 2432, a static memory 2434, or other memory, and a storage unit 2436, both accessible to the processors 2410 such as via the bus 2402. The storage unit 2436 and memory 2432, 2434 store instructions 2416 embodying any one or more of the functions described herein. The memory/storage 2430 may also store temporary, intermediate, and/or long-term data for processors 2410. The instructions 2416 may also reside, completely or partially, within the memory 2432, 2434, within the storage unit 2436, within at least one of the processors 2410 (for example, within a command buffer or cache memory), within memory at least one of I/O components 2450, or any suitable combination thereof, during execution thereof. Accordingly, the memory 2432, 2434, the storage unit 2436, memory in processors 2410, and memory in I/O components 2450 are examples of machine-readable media.

As used herein, "machine-readable medium" refers to a device able to temporarily or permanently store instructions and data that cause machine 2400 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 2416) for execution by a machine 2400 such that the instructions, when executed by one or more processors 2410 of the machine 2400, cause the machine 2400 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 2450 may include a wide variety of hardware components adapted to receive input, provide output, produce output, transmit information, exchange information, capture measurements, and so on. The specific I/O components 2450 included in a particular machine will depend on the type and/or function of the machine. For example, mobile devices such as mobile phones may include a touch input device, whereas a headless server or IoT device may not include such a touch input device. The particular examples of I/O components illustrated in FIG. 24 are in no way limiting, and other types of components may be included in machine 2400. The grouping of I/O components 2450 are merely for simplifying this discussion, and the grouping is in no way limiting. In various examples, the I/O components 2450 may include user output components 2452 and user input components 2454. User output components 2452 may include, for example, display components for displaying information (for example, a liquid crystal display (LCD) or a projector), acoustic components (for example, speakers), haptic components (for example, a vibratory motor or force-feedback device), and/or other signal generators. User input components 2454 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 2450 may include biometric components 2456, motion components 2458, environmental components 2460, and/or position components 2462, among a wide array of other physical sensor components. The biometric components 2456 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 2458 may include, for example, acceleration sensors (for example, an accelerometer) and rotation sensors (for example, a gyroscope). The environmental components 2460 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 2462 may include, for example, location sensors (for example, a Global Position System (GPS) receiver), altitude sensors (for example, an air pressure sensor from which altitude may be derived), and/or orientation sensors (for example, magnetometers).

The I/O components 2450 may include communication components 2464, implementing a wide variety of technologies operable to couple the machine 2400 to network(s) 2470 and/or device(s) 2480 via respective communicative couplings 2472 and 2482. The communication components 2464 may include one or more network interface components or other suitable devices to interface with the network(s) 2470. The communication components 2464 may include, for example, components adapted to provide wired communication, wireless communication, cellular communication, Near Field Communication (NFC), Bluetooth communication, Wi-Fi, and/or communication via other modalities. The device(s) 2480 may include other machines or various peripheral devices (for example, coupled via USB).

In some examples, the communication components 2464 may detect identifiers or include components adapted to detect identifiers. For example, the communication components 2464 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 2462, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A satellite communication system comprising:
a satellite gateway configured to communicate with a plurality of satellites over an air-interface;
a medium access control (MAC) layer in a protocol stack of the satellite gateway that supports the air-interface, wherein the MAC layer comprises a resource aggregation block to aggregate radio resources when allocating radio resources to a user terminal in a beam; and
a forward link frame structure with a number of sub-frames to communicate with the user terminal, wherein the user terminal is configured to wake up every Nth sub-frame, N being an integer greater than one, to conserve power resources of the user terminal.

2. The satellite communication system of claim 1, wherein the resource aggregation block comprises carrier aggregation to increase a number of allocated carriers in the beam to the user terminal.

3. The satellite communication system of claim 2, wherein the resource aggregation block comprises beam aggregation to allocate resources of an adjacent beam to the user terminal in the beam.

4. The satellite communication system of claim 3, wherein the MAC layer schedules the user terminal on a first carrier of the beam as well as a second carrier from the adjacent beam to improve throughput for the user terminal in the beam.

5. The satellite communication system of claim 4, wherein MAC layer first schedules the user terminal on the first carrier, and in response to a determination closeness to the adjacent beam, the MAC layer schedules on the second carrier associated with the adjacent beam.

6. The satellite communication system of claim 5, wherein:
the user terminal is configured to send a battery status to the gateway, and
in response to a signal from the gateway, the user terminal is configured to turn off portions of electronics in the user terminal to conserve battery resources.

7. The satellite communication system of claim 6, wherein the signal from the gateway is a discontinuous reception (DRX) signal from the gateway.

8. The satellite communication system of claim 1, wherein the user terminal is configured to wake up for a single slot of every Nth sub-frame.

9. A method for satellite communication comprising:
communicating by satellite gateway with a plurality of satellites over an air-interface;
supporting the air-interface with a medium access control (MAC) layer in a protocol stack of the satellite gateway that supports the air-interface;
allocating additional radio resources to a user terminal on a first beam by the MAC layer to provide resource aggregation that increases throughput for the user terminal;
communicating with the user terminal with a forward link frame structure with a number of sub-frames; and
waking up the user terminal every Nth sub-frame, N being an integer greater than one, to conserve power resources of the user terminal.

10. The method of claim 9, further comprising allocating resources of an adjacent beam to the user terminal on the first beam.

11. The method of claim 10, further comprising scheduling the user terminal on a first carrier of the first beam as well as a second carrier of the adjacent beam to improve throughput for the user terminal in the first beam.

12. The method of claim 11, wherein MAC layer first schedules the user terminal on the first carrier, and after determining a user is close to the adjacent beam, the MAC layer schedules the user terminal on the second carrier associated with the adjacent beam.

13. The method of claim 9, further comprising:
sending a battery status to the gateway, and in response to a signal from the gateway, turning off portions of electronics in the user terminal to conserve battery resources.

14. The method of claim 13, wherein the signal from the gateway is a discontinuous reception (DRX) signal from the gateway.

15. The method of claim 9, wherein the user terminal wakes up for a single slot of every Nth sub-frame.

16. A satellite communication system comprising:
a satellite gateway communicating with a plurality of satellites over an air-interface;
a medium access control (MAC) layer in a protocol stack of the satellite gateway that supports the air-interface comprises a resource aggregation block to aggregate radio resources when allocating radio resources to a user terminal;
a resource aggregation block provides beam aggregation that allocates resources of an adjacent beam to a user terminal on a beam by first scheduling the user terminal on a first carrier, and after determining the user terminal is close to the adjacent beam, the MAC layer schedules the user terminal on a second carrier associated with the adjacent beam; and
a forward link frame structure with a number of sub-frames that communicates with the user terminal, wherein the user terminal wakes up every Nth sub-frame, N being an integer greater than one, to conserve power resources of the user terminal.

17. The satellite communication system of claim 16, wherein:
the user terminal sends a battery status to the gateway, and
in response to a signal from the gateway, the user terminal turns off portions of electronics in the user terminal to conserve battery resources.

* * * * *